INVENTOR
WILLIAM E. GAY
BY
ATTORNEY

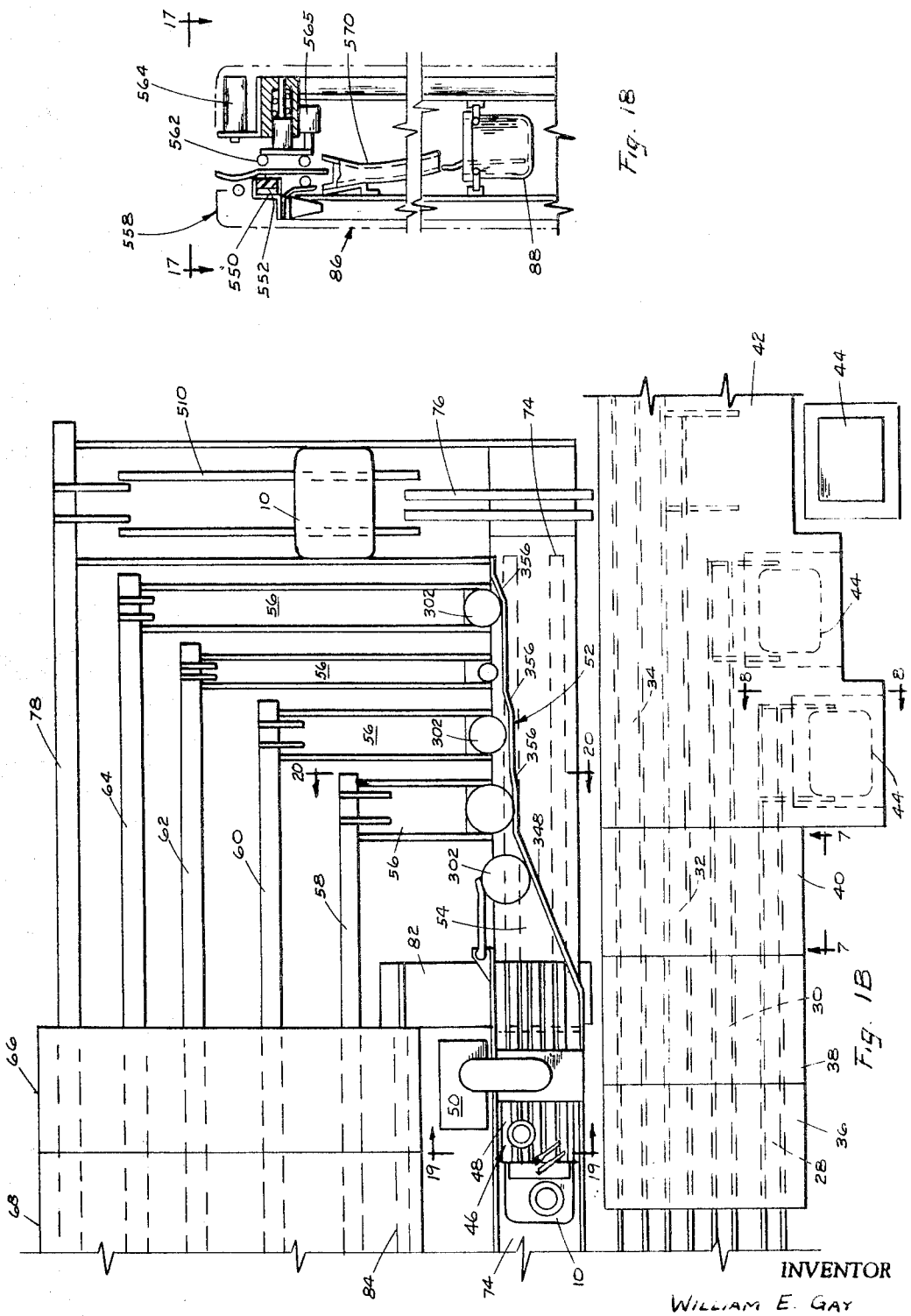

INVENTOR
WILLIAM E. GAY

BY
ATTORNEY

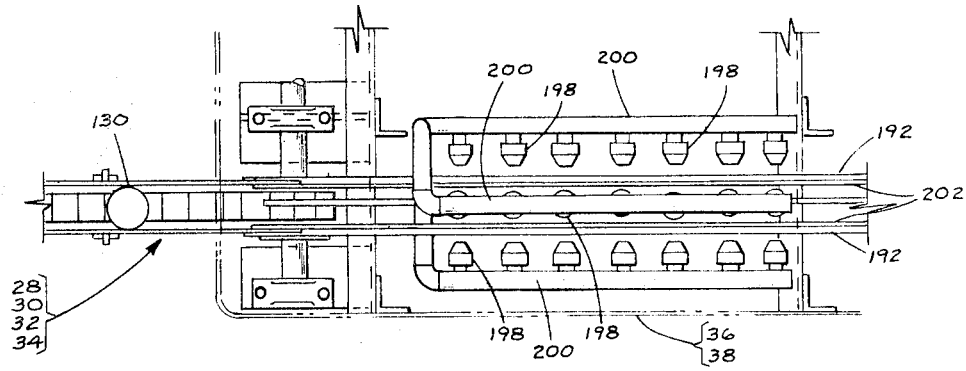
Fig. 6
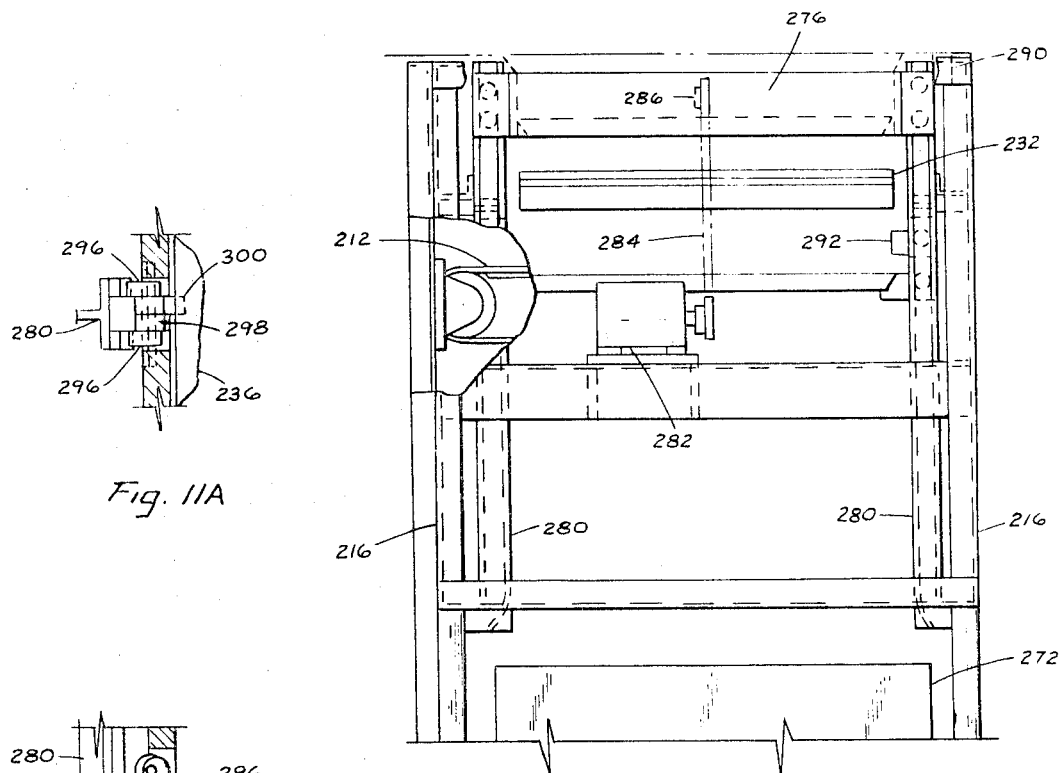
Fig. 10
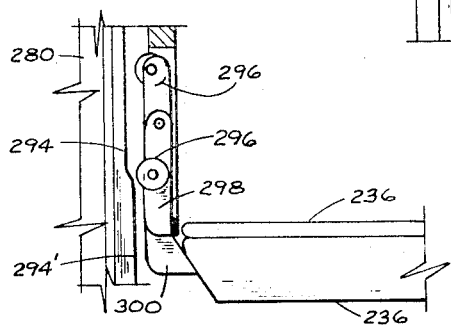
Fig. 11A
Fig. 11
INVENTOR
WILLIAM E. GAY
BY
ATTORNEY July 14, 1970    W. E. GAY    3,520,726
APPARATUS FOR AUTOMATICALLY CLASSIFYING, WASHING, SANITIZING, AND
DRYING SOILED DISH AND HOLLOWARE ITEMS
Filed Oct. 27, 1967    18 Sheets-Sheet 7

INVENTOR
WILLIAM E. GAY

BY

ATTORNEY

INVENTOR
WILLIAM E. GAY

BY

ATTORNEY

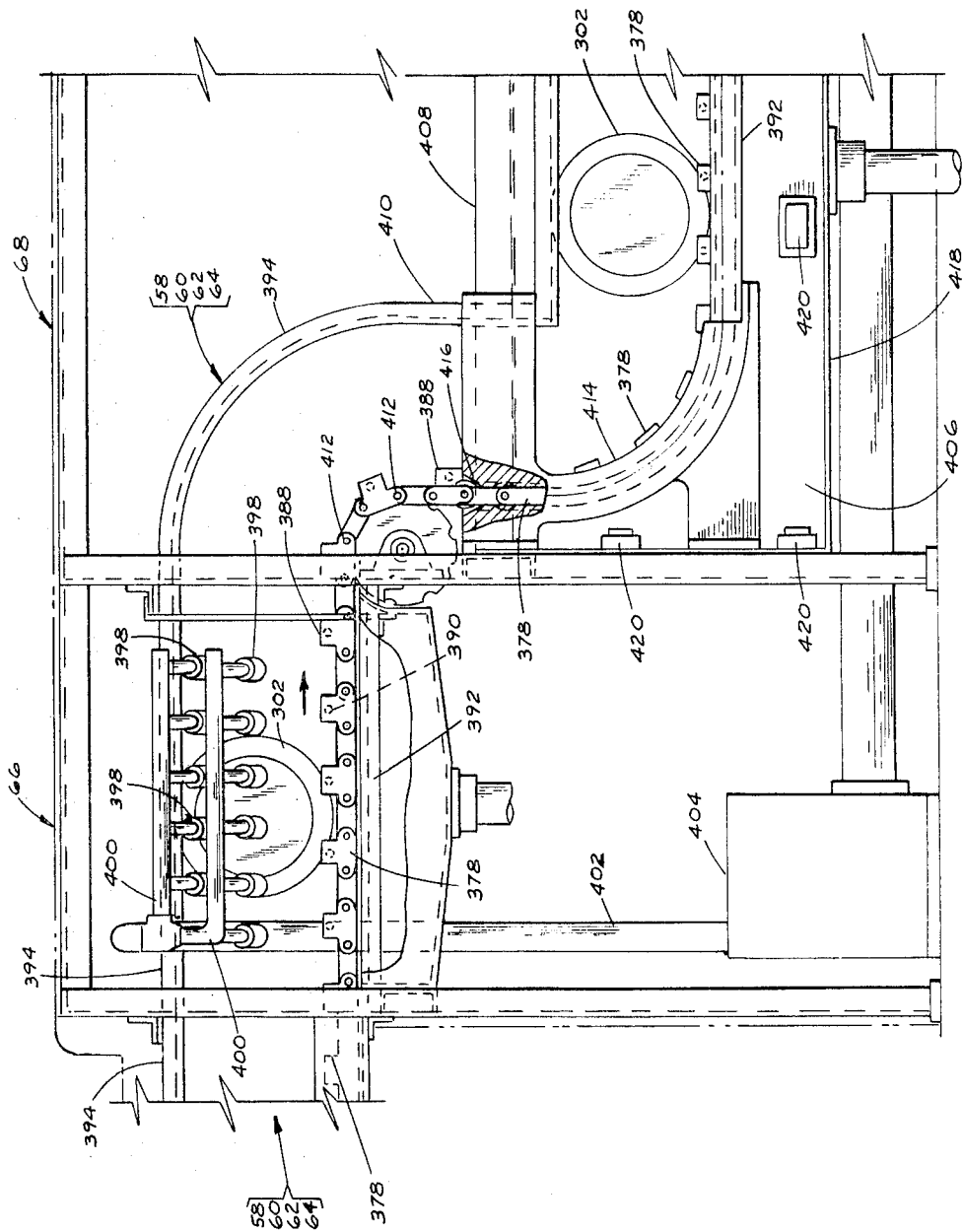

INVENTOR
WILLIAM E. GAY

BY
ATTORNEY

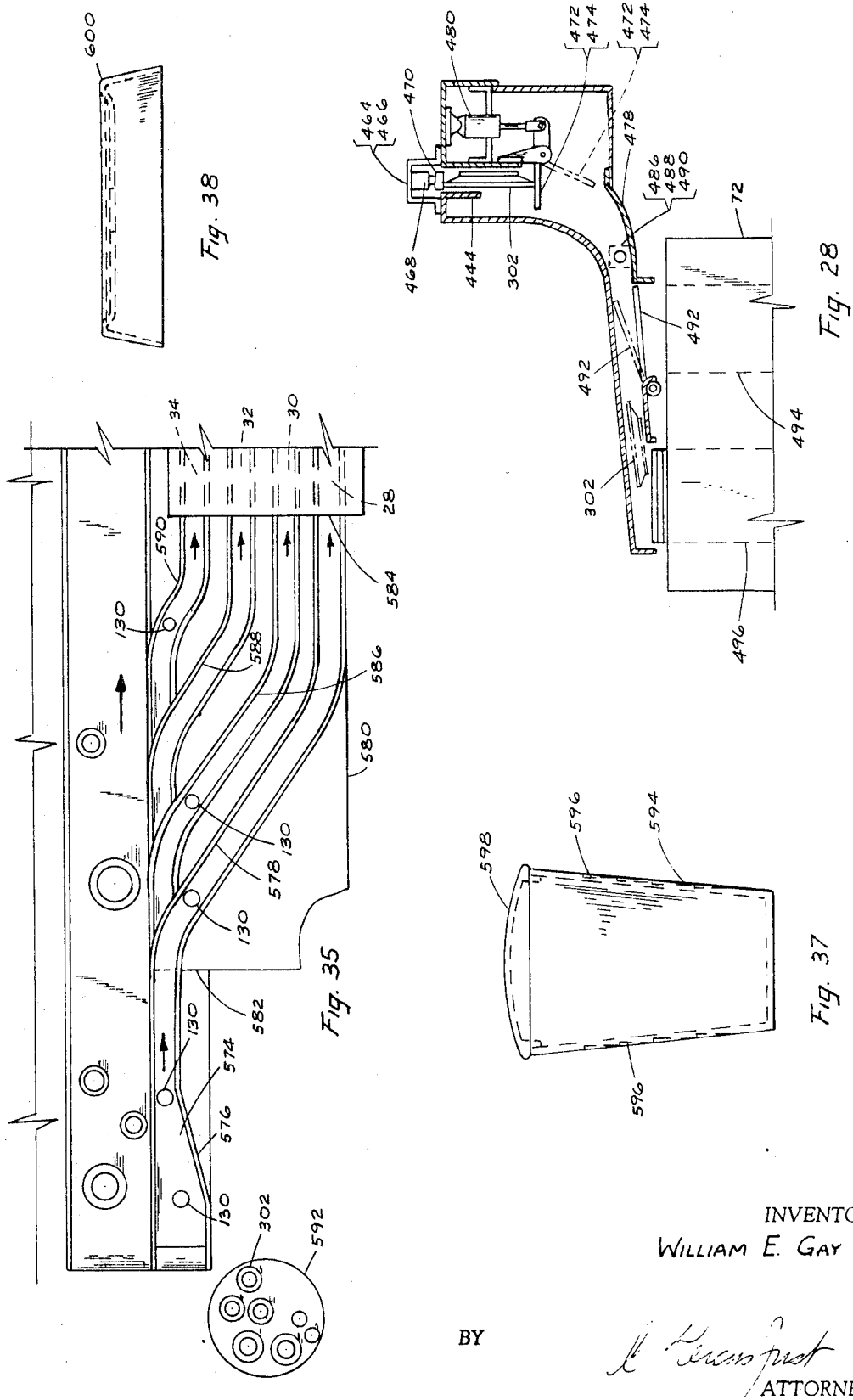

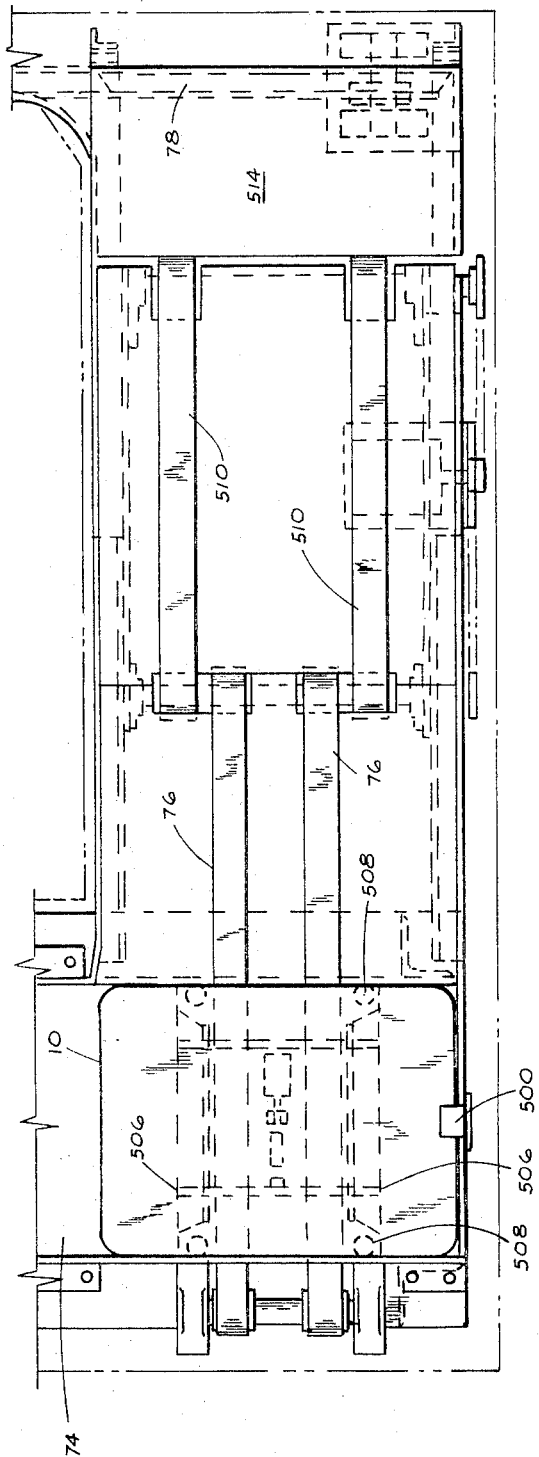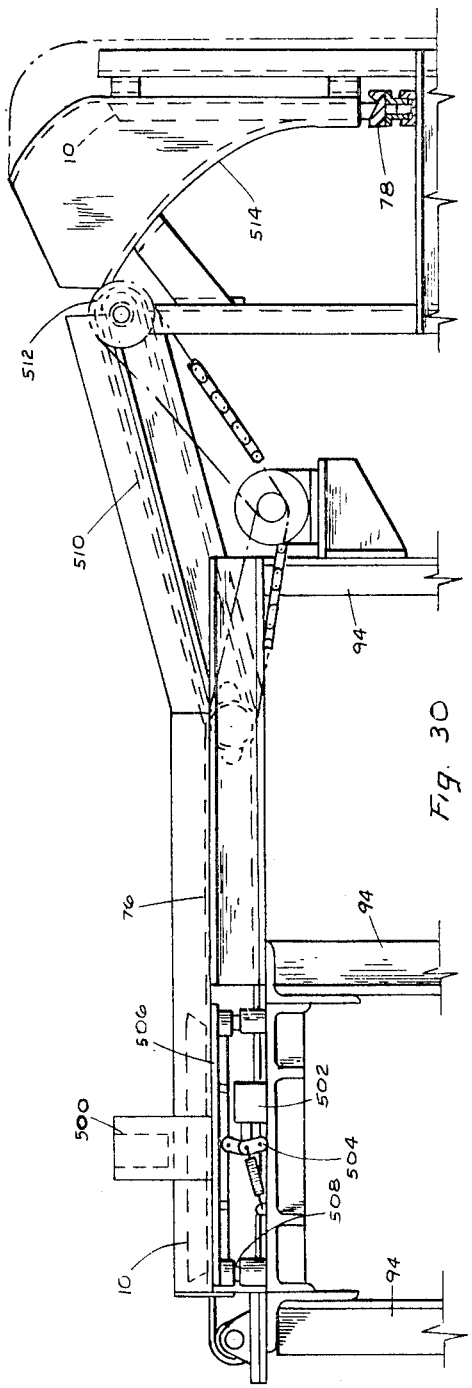

United States Patent Office 3,520,726
Patented July 14, 1970

3,520,726
APPARATUS FOR AUTOMATICALLY CLASSIFY-
ING, WASHING, SANITIZING, AND DRYING
SOILED DISH AND HOLLOWARE ITEMS
William E. Gay, 269 Pleasant Drive, Warren, Pa. 16365
Filed Oct. 27, 1967, Ser. No. 678,592
Int. Cl. B08b 3/02
U.S. Cl. 134—63                               51 Claims

ABSTRACT OF THE DISCLOSURE

Several embodiments of automatically operated dish, holloware and silverware sanitizing apparatus, for successively cleansing, sterilizing and drying dish items, silverware, and holloware items such as cups and glassware after the same have been classified and segregrated for movement through separate paths in appropriate baths and atmospheres to accomplish the sanitizing steps, followed by assembly of such items respectively into vertical stacks of dish items, containers of silverware, and trays containing closely assembled rows of inverted holloware items for storage and reuse, one of the embodiments of apparatus including automatically operable means to classify and separate a heterogeneous mixture of such items into individual rows of similar dish items classified according to type, similar holloware items classified according to size, and silverware classified according to item.

BACKGROUND OF THE INVENTION

For many years, so-called automated dishwashing machines have been available and numerous improvements have been made in these for the last 50 or 60 years. Such improvements primarily, however, have been of a minor nature and no outstanding or significant changes have been made during this period in the basic apparatus or machine arrangement in which a series of usually similar racks or trays, after being manually loaded either in heterogeneous, or somewhat manually partially classified manner, with dishes and holloware, are moved through various adjacent compartments which usually comprise those arranged to pre-rinse the trays full of items, wash the same with appropriate solutions, either change the wash solution to a rinse or subsequently rinse the trays of items in a separate compartment, dry the items to varying degrees either by heat or air blasts, and then requiring manual removal of the items from the trays for stacking or otherwise.

In restaurants, hotels, institutions such as schools and hospitals, industrial and commercial cafeterias and other food-serving institutions, the personnel requirement alone for the dishwashing functions is very substantial. It is not uncommon for even a moderate size school or hospital, for example, to require as many as 6 or 8 attendants to administer the use of the dishwashing equipment. Because of the uncomfortable conditions normally existing in the dishwashing area of such institutions, it is difficult to maintain steady employment because, in addition to such operating conditions, the wages normally paid for such services usually are among the lowest which are paid commercial help of almost all categories. Notwithstanding this, if an adequate crew of operators are not available to satisfactorily operate the dishwashing equipment, many unsatisfactory conditions can arise, such as a shortage of needed dishes and holloware items such as cups and glassware, including tumblers, ice tea glasses and the like. Frequently, dishes with egg stains and the like must be sent through the washing cycle a number of times. In attempts to accelerate the obtaining of at least washed and partially dried dish and holloware items, especially during rush hours in such food-serving institutions, only partially dried items frequently are available.

Under normal conditions of operating the dishwashing facilities of food-dispensing institutions of the type referred to above, it normally is customary to conduct a scraping of food stuffs remaining upon the dishes and in the holloware, pre-soaking the same prior to stacking them in the trays or conveyors by which they pass through the washing and drying equipment. Such scraping and pre-soaking usually is undertaken in a careless manner. The dishes and holloware, while still wet from such pre-soaking are placed in open rail types of racks and the like and then are placed upon belt-type conveyors so that water dripping from the dish and holloware items usually accumulates upon the floor of the washroom, thereby making a further undesirable working atmosphere.

The need to employ hot water and sometimes steam in the dishwashing machine also usually raises the temperature of the washroom to uncomfortable heights, as a result of which dissatisfied employees frequently handle the dishes and glassware roughly, thus resulting in extensive breakage which materially adds to the cost of operating the institution in which such washing facilities are located.

One of the principal reasons for requiring a rather substantial number of employees in washroom facilities of the type referred to is the present extensive need to manually handle, individually, the dish items as well as all forms of holloware items so as to initially place the same in appropriate racks which then are placed upon the usual conveyor which passes successively through all of the various compartments of the washing machine described above and then, upon emerging from the drying end of the machine, it is again necessary to individually handle each item to either stack the same or place the holloware, for example, on appropriate trays or in racks for storage and subsequent reuse.

Certain types of currently employed dishwashing machines utilize articulated belt means having a series of closely spaced elongated finger-like members, usually of a rubber or plastic nature, between which dishes of various sizes are inserted on edge, said fingers usually extending in a slanting manner with respect to the plane of the conveyor moving through the machine. Obviously, conveyors of this type require manual loading and unloading and it is essential that a full crew operate respectively at the loading and unloading ends of the machine if the same is to be oporated in any way approaching intended maximum efficiency because no other means are provided for loading the conveyor or unloading the same, other than the manual employees referred to.

One additional unsatisfactory aspect of the currently used procedures such as those described comprises the fact that even if great care is exercised in washing, sterilizing and drying dishes and holloware by presently used machines in order to render them as asceptic as possible, the very fact that they are operated by hand obviously offsets all the care which has been exercised to sterilize the same, unless the hands of the operator are similarly maintained in asceptic condition, which is rarely the case. Usually, the hands of such operators invariably are wet and germs breed best in moist atmospheres.

SUMMARY OF THE INVENTION

It is the principal object of the present invention to provide several different dishwashing systems which include, to a large extent, similar operating units employed in said systems which are power-operated and require a minimum of human supervision and manual operation. The principal difference between the various embodiments comprises the degree of automation which is desired, or can be afforded by a particular institution, at the entrance end of the system where classification and separation of the various soiled items into similar categories is undertaken and depending upon whether such operation is desired to be fully automatic or of different degrees of limited manual nature.

It is another object of the invention to provide a substantially fully automated system of washing, sterilizing and drying dish items, silverware and holloware items, such embodiment requiring only a single operator whose principal function is to see that only a single layer of soiled items exists on trays thereof being delivered to the machine.

It is still another object of the invention to provide an embodiment which is very extensively automated and is especially for use in establishments and institutions employing waitresses and bus-boys wherein trays are used which contain an assortment of mixed soiled dish items, silverware and holloware are positioned for an operator to manually and quickly remove all the dish items and silverware from the trays and place them on a main feed conveyor to deliver the same to automated classifying means, while all the holloware items on the trays are manually placed quickly by the operator upon another main feed conveyor, in inverted position, for movement to automated classifying means, after which all of said items are passed automatiually through washing, sterilizing and drying units, followed by compactly arranging the same according to kind and size in suitable receptacles, racks or trays therefor.

It is a further object of the invention to provide another embodiment in which, even in a dishwashing system of large capacity, only several employees are required to receive assortments of soiled dishes, holloware and silverware on trays, such as those employed in cafeterias, schools and similar institutions and in which, for example, said several employees quickly sort such assemblies of soiled dishes, holloware and silverware onto separate conveyors for the various sizes, types and kinds of items for immediate passage to the washing, sterilizing and drying compartments, followed by automatic stacking of the dish items and disposing the holloware items in inverted position, in compact rows, preferably upon trays for storage until further use.

It is still another object of the invention in regard to either embodiment referred to above to provide conveyor means upon which soiled dishes are received initially in substantially horizontal position, then are automatically shifted to vertical position upon conveyor means which gradually change contacts with the rims of such dish items while the same are passing through the washing, sterilizing and drying compartments, followed by means operable automatically to restore the dish items to horizontal position and automatically stack the same preferably into supporting and receiving means which gradually lower the stack as it increases in size so as to dispose the upper end thereof substantially at the level to receive additional dish items successively to be stacked thereon.

Ancillary to the foregoing object, it is still another object of the invention preferably to provide such receiving and stacking mechanism in multiple units arranged to initially direct all of the dish items initially delivered thereto in one stack and upon said stack comprising a predetermined number of items, the delivering means is automatically shifted to deliver successive dish items to the second stacking means, following which the receiving and stacking means preferably are of a portable nature so as to be quickly moved to a storage space and said means is replaced by an empty receiving and stacking means, including suitable positioning mechanism to insure desired reception of the dish items by said receiving and stacking means.

In the embodiment of the invention arranged for substantially complete automatic removal of soiled dish and holloware items from trays thereof, such as in cafeterias operated by manufacturing plants, hospitals, schools and similar institutions, wherein the patrons carry their soiled dishes and holloware upon individual trays to a receiving carrier or the like, it is a further object of the invention to provide automatically operable means to engage oncoming trays of soiled items initially to be engaged by successive holloware removal units respectively conditioned to accept and remove from the trays holloware of a particular size, said removal units automatically transferring the holloware, in inverted condition, to transfer conveyor means by which the holloware is carried through the washing, sterilizing and drying units of the systems, followed by engagement of additional automatic mechanism by which the holloware is arranged, while still in inverted position, in compact rows, preferably upon trays which, as they become filled, are automatically removed and stacked upon other filled trays of completely sanitized holloware until ready for further use.

Further in regard to the embodiment of the invention described immediately above, another object of the invention is to provide automatically operable means to classify and separate dish items respectively into individual sizes according to type, from which means they are received for shifting into the aforementioned vertical position in which they are received by conveyor means for passage through the washing, sterilizing and drying units of the system, followed by stacking and the like.

Particularly in the aforementioned fully automatic embodiment of the invention, in which the soiled dishes are disposed on trays, to provide means to remove the dishes from such trays after previous removal of the holloware therefrom, such removal means being of a type to extend into the trays and insure positive removal and elevation of the dish items therefrom while the trays are conveyed to a washing and drying compartment therefor in the system, the removal and elevating means carrying dishes and silverware to the aforementioned classifying means.

Ancillary to the foregoing object of the invention, it is a further object to provide silverware-handling mechanism which automatically insures separation of the silverware from the dish items prior to the latter being conveyed to the classifying mechanism, the silverware-handling mechanism being of a nature to automatically dispose the silverware items vertically for movement through washing, sterilizing and drying compartments, followed by automatic classification into the respective items such as knives, forks, and spoons of one or more types and then automatically discharge the same either into containers, or packaging mechanism in which a desired assortment of such items are placed in sealed bags or the like in sanitary condition.

Still another object of the invention is to provide in the various embodiments thereof debris-removal means, preferably of a suction nature, by which the major portion of foodstuff remainders, refuse items such as paper napkins, empty cigarette packages and the like, are removed from the dish items for immediate transfer to waste collection means in order to maintain the washing, sterilizing and rinsing baths which are provided in as clean condition as possible.

It is still another object of the invention to provide appropriate power means and control mechanism therefor, including suitable timing means, where appropriate, interlocking mechanism insuring successive and timed operations, and the like, whereby all of the automatically operable conveyor means are driven at desired, interrelated speeds with respect to the various units and items in the entire system.

Details of the invention and the foregoing objects, as well as other objects thereof, are set forth in the following specification and illustrated in the accompanying drawings comprising a part thereof.

DESCRIPTION OF THE DRAWINGS

FIGS. 1A and 1B are diagrammatic plan views of one embodiment of an automatic dish cleansing and sanitizing system incorporating the invention and respectively comprise approximate halves of the entire apparatus.

FIG. 6 is a fragmentary plan view of one of the holloware transfer conveyor means and part of a typical washing and rinsing section of the apparatus.

FIG. 10 is a side elevation of the mechanism shown in FIGS. 8 and 9.

FIG. 11 is a fragmentary side elevation of a detail of the mechanism shown in FIGS. 8–10.

FIG. 11A is a fragmentary plan view of the mechanism shown in FIG. 11.

FIG. 18 is a vertical sectional elevation of the mechanism shown in FIG. 17, as seen on the line 18—18 of FIG. 1A.

FIG. 22 is a fragmentary side elevation of portions of the pre-wash mechanism and ultrasonic cleaning tanks for the dishes.

FIG. 28 is a front vertical sectional view of the mechanism shown in FIG. 27, as seen on the line 28—28 therein.

FIG. 29 is a fragmentary plan view of transfer mechanism to remove trays from the feed conveyor after removal of all dish items, holloware and silverware therefrom and transfer the same to the washing conveyor therefor.

FIG. 30 is a rear vertical elevation of the mechanism shown in FIG. 29.

FIG. 35 is a fragmentary plan view of the entrance end of feed conveyor means for another embodiment of cleansing and sanitizing system from that shown in FIGS. 1A and 1B and adapted to receive dishes, glassware and silverware classified and fed thereto manually.

FIGS. 37 and 38 respectively are side elevations of disposable accessory items adapted for use with the present invention to minimize the items required to be washed by the systems illustrated in the foregoing figures.

DESCRIPTION OF THE PREFERRED EMBODIMENTS

As indicated hereinabove, the present invention comprises a plurality of different embodiments of dishwashing systems and methods to be performed thereby. Primarily, these embodiments differ from each other in regard to the manner in which the soiled mixtures of dish items, silverware and holloware items are segregated or classified and are delivered to the sanitizing mechanisms comprising the various washing, sterilizing and drying units or compartments of the system. Certain of these differences are based upon whether the soiled food and beverage-serving items are classified automatically or manually.

As might be surmised, the most complex system is that in which the soiled food and beverage-serving items, including various sizes and kinds of dish items, silverware, and holloware such as cups and different sizes of glassware are classified and separated automatically before being passed to the various processing units and compartments of the entire system. Accordingly, this more complicated system has been selected for initial description and such overall system is illustrated, somewhat diagrammatically, in FIGS. 1A and 1B. Two figures are required to accomplish this in view of the extent of the system which, if illustrated in a single view on one sheet of drawing, would render certain elements thereof so small as to be obscure.

Figure 1A:
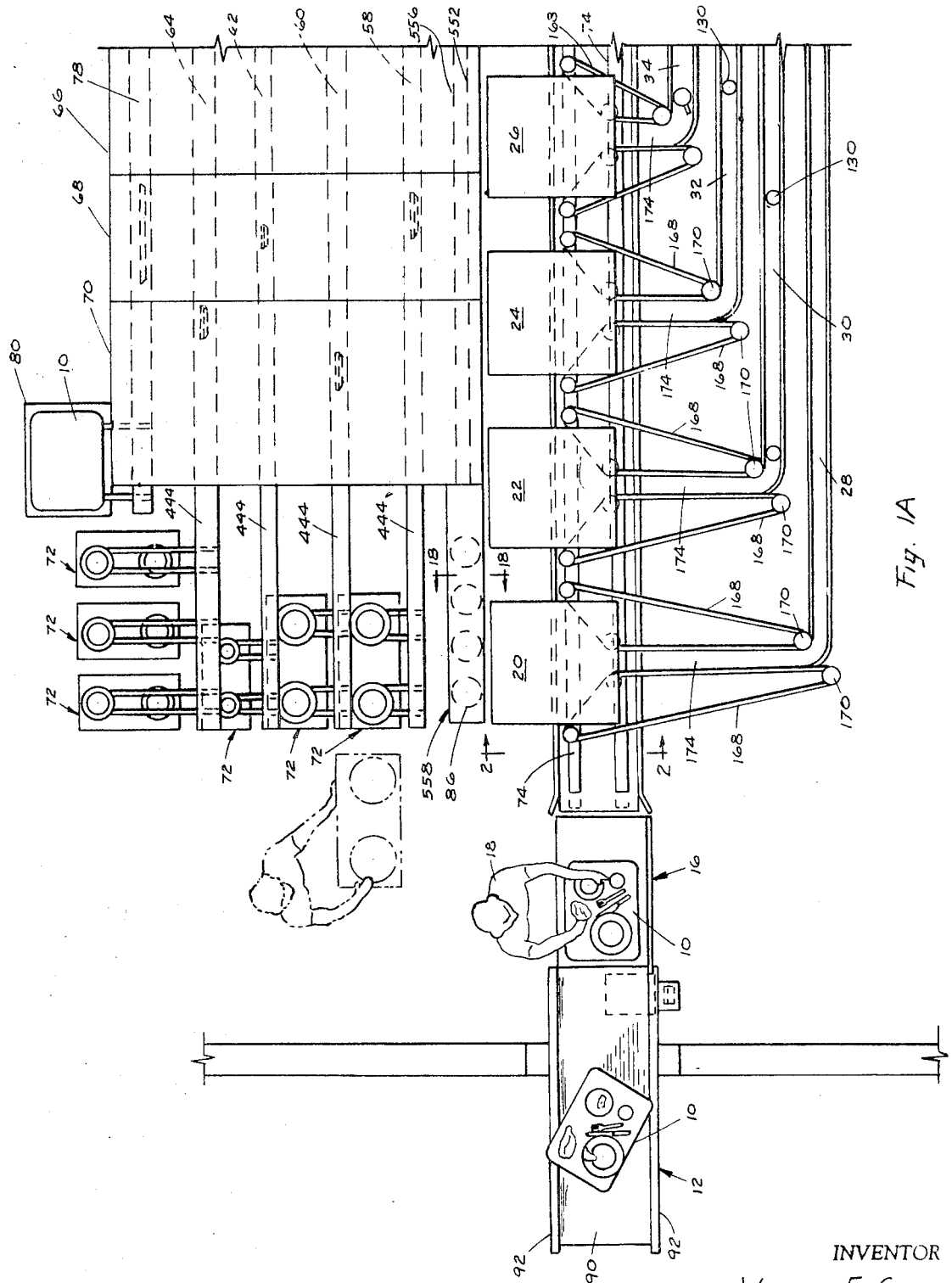

Referring to FIGS. 1A and 1B, it is presupposed that the soiled food and beverage-serving items are delivered for sanitizing operations upon individual trays 10 of the type utilized in cafeterias where individual patrons move along a line to be served selected foods and beverages upon various types of plates and in various kinds of holloware which are placed upon a tray by the patron in order to carry the same to the checkout counter and to a selected location at a table in an exemplary cafeterial or dining hall. A very substantial amount of food is served each day in cafeterias of this type, school dining halls and the like, whereby extensive need exists to completely sanitize the food and beverage-serving items after the food has been consumed by a patron.

Under normal circumstances, trays with such soiled items thereon are delivered by the patron at the completion of a meal to a receiving conveyor 12 which may be of desired length and extend through an opening 14 in a wall separating the dining area from the dish-sanitizing area. The conveyor 12 carries the trays successively to station 16 where an attendant 18 is stationed to quickly insure that all soiled items on each tray 10 are what is termed only one high thereon. That is, no two dishes are stacked upon each other; nor are any of the holloware items stacked within or upon each other or upon the dish items. Similarly, none of the silverware items are disposed within or upon any of the dish or holloware items. This insures that the various units and compartments of the ensuing sanitizing system may function accurately and effectively to wash, sterilize and dry all of the items, followed by arranging the same into compact formation, such as vertical stacks of dish items, closely arranged rows of inverted holloware items upon trays, and the silverware items are disposed in holders or packages, after which all of the thus sanitized items are ready for storage and ultimate reuse.

The term "sanitizing" embraces a number of operations such as, but not necessarily restricted to, pre-rinsing the soiled items of all kinds, washing them, sterilizing them such as by passing them through and retaining them within a steam atmosphere, for example, of appropriate pressure and temperature, drying such items, and before drying the same, it is contemplated further that the sanitizing system may also include an ultrasonic bath either in place of or in addition to one of the operations just recited, such as the washing unit, so as to positively and mechanically insure, as well as facilitate, the ready removal of extraneous material from the dish, silverware and holloware items, even including lipstick and other similar tenaceously adhering materials.

Before proceeding to discuss further details of the sanitizing system illustrated in FIGS. 1A and 1B, it is desired to define at least the more common types of food and beverage-serving which can and are intended to be cleansed, dried and compactly arranged by said system. Among the dish items, it is contemplated that various sizes of plates, including not only dinner and luncheon plates but also so-called bread and butter plates are included. In addition, sauce dishes, and soup and salad bowls are included. Among the silverware items, the most common are knives, forks and spoons and it should be understood that in order to maintain automatically operable systems of the type comprising the present invention, only the most commonly used dish, silverware and holloware items are conveniently processed by such system. That is, certain exotic or unusual types of dish and holloware items, as well as possibly some types of silverware items not commonly found in normal restaurants or dining rooms in the average type of institution cannot be processed in such system. However, it is contemplated by the present invention that where certain presently used items such as individual small coffee pots with hinged lids, and metal dish covers may present difficulties, the same readily may be obviated by utilizing inexpensive and disposable substitute items, certain designs of which are illustrated and described hereinafter in the specification and in certain figures of the drawings.

Among the holloware items most commonly found in particular in large restaurants, institutional dining rooms and the like, are cups, footed sherberts, water tumblers and ice tea glasses. Parfait glasses also are not unacceptable to systems of the type to which the present invention pertains, especially since they more or less are as readily processed as ice tea glasses. Further, it also is intended that the type of dish and holloware items which are most suitable to be sanitized by systems of the type comprising the present invention are those kinds and types which now are presently used in normal types of restaurants, institutional dining rooms and even in certain exclusive clubs and dining rooms. Such items normally are of a relatively durable nature so as to be capable of withstanding reasonable handling and a certain amount of jostling without readily chipping or breaking.

For purposes of generally designating the more important units and compartments of the sanitizing system shown in FIGS. 1A and 1B, the following introductory description thereof is set forth. The receiving conveyor 12 delivers the trays 10 with soiled items in one high condition thereon successively to a series of holloware-removal units 20, 22, 24 and 26, details of which are described hereinafter. Each of these are designed to remove from the trays, automatically, different kinds and sizes of holloware items, it being understood that each unit removes only a single type or size of holloware unit from the trays 10, inverts the same, and moves them in such inverted condition along belt-type conveyors 28, 30, 32 and 34 successively to the sanitizing mechanism comprising washing compartment 36, sterilizing compartment 38, drying compartment 40 and receiving compartment 42, wherein the individual sizes and kinds of holloware respectively are arranged while still in inverted condition, in compact rows upon suitable storage trays 44, which are shown in exemplary manner in FIG. 1B.

After removal of the holloware items from the trays 10, the trays move into engagement with a dish item removal unit 46, details of which are described hereinafter. Such unit also removes the silverware from the trays 10 and the dishes and silverware then are carried by a series of parallel, narrow conveyor belts 48 beneath a vacuum-type debris removal unit 50, to a classifying and separating unit 52 through which the dishes are carried by a classifying conveyor 54 for separation into similar categories according to size, such as diameter, and details of the mechanism and function thereof are set forth hereinafter.

The classified dish items are moved by transfer conveyors 56 to sanitizing conveyor means 58, 60, 62 and 64, the function of which is to move the dish items, after classification into categories according to size, to and through the dish washing compartment 66, dish sterilizing compartment 68, and dish drying compartment 70, after which the sanitizing conveyor means continue to move the dried dish items to receiving means 72 which are arranged and equipped respectively to receive dish items of uniform size, arrange the same in vertical stacks, and permit the receiving means to be removed from the receiving station shown in FIG. 1A, to other storage areas when the receiving means are filled with their full complement of stacked dish items. Each of these units preferably comprises two stacks of dishes of uniform size and the same readily are portable by means of suitable casters. When the receiving means 72 are filled with their complement of dish items, the attendant 18, at least under normal operating conidtions, can momentarily divert himself from the duties at station 16 to quickly remove the filled receiving means 72 and replace it with an empty one, and then quickly return to station 16.

After the dish items and silverware are removed from the trays 10 at the dish removal unit 46, they are elevated by said unit onto the narrow conveyor belts 48 which are at a level above the feed conveyor 74 which moves the trays from station 16, through the various holloware removal units, to the dish removal unit 46. After removal of the dish items and silverware from the trays 10, said trays continue upon feed conveyor 74 to a lateral transfer conveyor 76, shown in FIG. 1B, for movement of the trays 10 to their sanitizing conveyor 78 by which the trays are carried successively through the washing compartment 66, sterilizing compartment 68 and drying compartment 70.

Then the trays are discharged onto tray-receiving means 80 which are shown diagrammatically in FIG. 1A.

After the silverware items are removed from the trays 10 by the removal unit 46, arrangements are provided by which they drop through the spaces between the conveyor belts 48 and are received upon silverware conveyor belt 82 for transfer to a silverware sanitizing conveyor 84 by which they are carried through the various washing, sterilizing and drying compartments 66, 68 and 70, after which they are carried to the silverware storage arranging unit 86 where the various kinds of silverware respectively are received in appropriate containers 88, compactly, until ready for reuse.

Having generally described the overall arrangement of the various units and compartments, as well as conveyor means and the like of the embodiment of the invention illustrated in FIGS. 1A and 1B, detailed description thereof now will be set forth, especially in regard to the novel aspects of the same.

HOLLOWARE REMOVAL

The receiving conveyor 12 preferably comprises a central portion 90 and two narrow, side conveyors 92 which preferably travel at different speeds with respect to each other as well as the central conveyor portion 90, thereby serving to position an irregularly disposed tray 10 substantially in rectangular arrangement upon the central portion 90 so that by the time the tray reaches station 16, operator 18 does not need to align the tray upon the conveyor 90 and the same is positioned for immediate reception upon the feed conveyor 74. The latter conveyor preferably comprises a pair of parallel continuous chains 74 trained around suitable sheaves or sprockets and driven by appropriate power means which activate the same. Otherwise the chains are slidably disposed upon suitable horizontal frame members of customary type for use with conveyor chains of the kind illustrated.

Figures 2, 5:
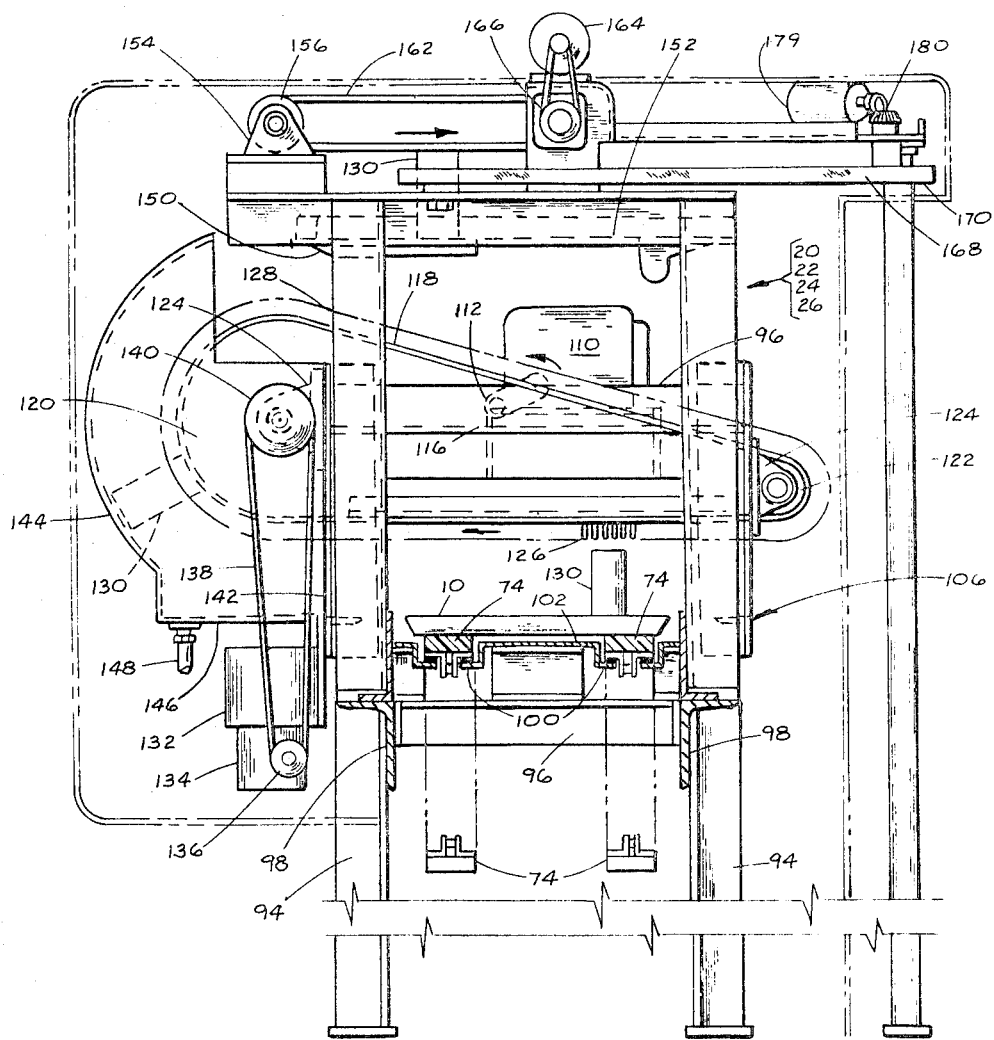
FIG. 2 is a front vertical elevation of one of the holloware removal units as seen on the line 2—2 of FIG. 1A.
FIG. 5 is a fragmentary, enlarged plan view of a detail of the unit shown in FIGS. 2–4.
Figure 3:
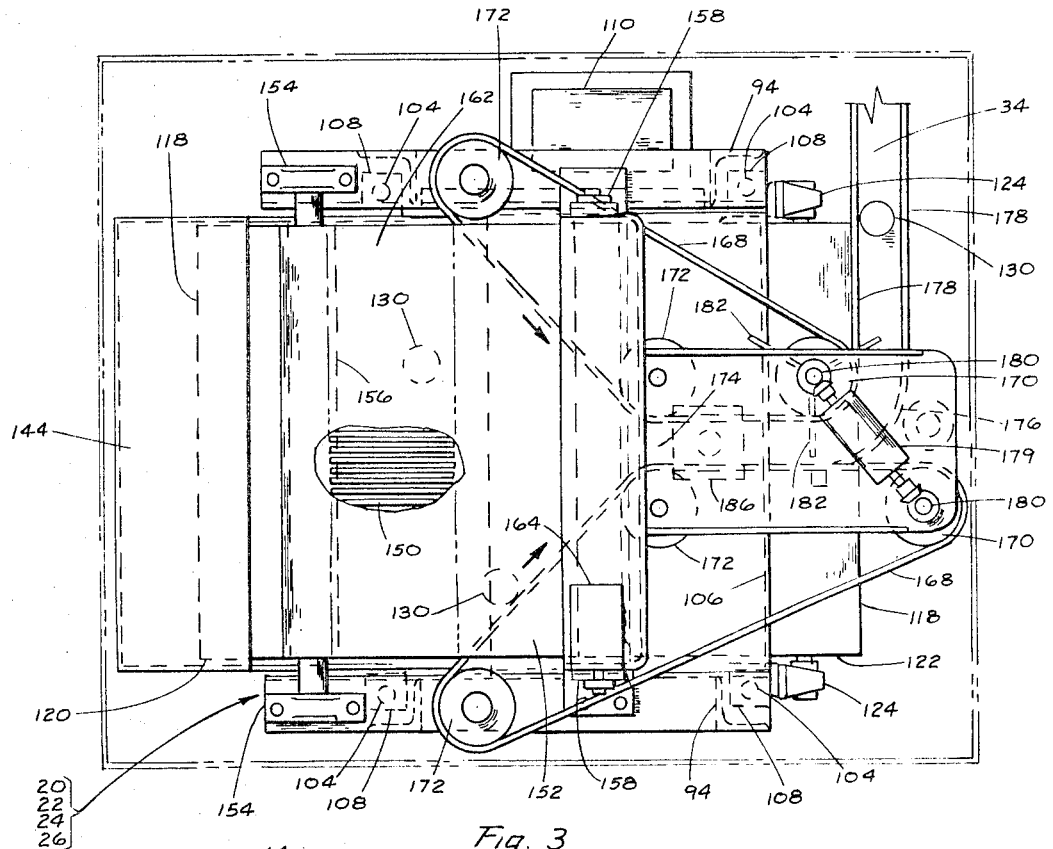
FIG. 3 is a plan view of the holloware removal unit shown in FIG. 2.
Figure 4:
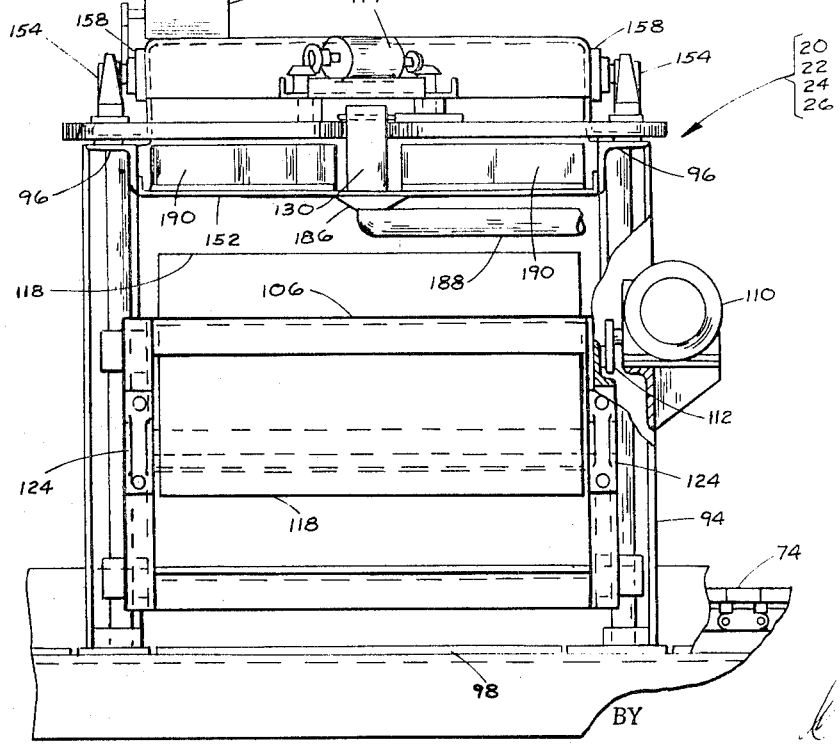
FIG. 4 is a side vertical elevation of the holloware removal unit shown in FIGS. 2 and 3.

The feed conveyor 74 operates at a predetermined, steady speed such as is capable, for example, but without restriction thereto, of moving approximately 500 trays per hour through the various units serviced thereby. Said conveyor moves a tray 10 upon which soiled food and beverage-serving items are arranged in one high condition successively to the first holloware removal unit 20, details of which are best shown in FIGS. 2–4. Said figures will suffice to illustrate the details of the holloware removal units 20, 22, 24 and 26, the only difference between the same being the elevation at which the pick-up mechanism initially is set to operate, in accordance with the height of the holloware items such as cups, water tumblers, ice tea glasses and parfaits.

Referring to FIG. 2 in particular, which is taken on the line 2—2 of FIG. 1A, it will be seen that a pair of parallel, vertical frame members 94, which preferably are angle members, are supported at the lower ends upon a floor surface, for example, and are connected by a transverse frame member 96. Pairs of such vertical members 94 are arranged in longitudinally spaced relationship along the entire system, especially for purposes of supporting the feed conveyor 74 and the mechanism assicated therewith.

Extending between such pairs of vertical frame members 94 are longitudinally extending frame members 98 which are parallel to each other and are respectively disposed adjacent opposite sides of the longitudinal space within which the endless belts or chains which comprise feed conveyor 74 are disposed. Preferably, said belts or chains move longitudinally within appropriate longitudinally extending troughs or channels 100 which are appropriately supported by the frame of the dishwashing machine and may, for example, be formed in a longitudinal and transversely extending sheet metal plate 102, the opposite edges of which are connected to the longitudinally extending frame members 98.

Referring to FIG. 2, which is a top plan view of one of the holloware removal units, it will be seen that a rectangular arrangement of four vertical guide rods 104 are secured in parallel relationship to each other by appropriate connections to the frame members which support each of said removal units. A frame 106, which is rectangular in plan view as shown in FIG. 3, may be formed from appropriate sheet metal or the like and the corners thereof are provided with suitable guide bearings 108 which engage the guide rods 104 for vertical movement of the frame 106 with respect to said guide rods. Such movement is performed by a motor 110 which is mounted stationarily upon one of the transverse frame members 96, as shown in FIG. 2. A crank arm 112 is rotated by motor 110 through means of a suitable gear reduction unit or the like. The outer end of the crank arm 112 moves in a horizontal guide in cross member 116 on frame 106. It thus will be seen that continuous operation of motor 110 results in continuous vertical reciprocation of frame 106 and the mechanism carried thereby which is as follows.

Referring to FIG. 2, it will be seen that each of the vertically movable frames 106 of the various holloware removal units supports an endless belt 118 which extends around a pair of drums 120 and 122 respectively supported on shafts, the opposite ends of which are rotatably mounted within appropriate bearings 124. The bearings 124 are supported upon suitable side members on frames 106. The belt 118 preferably is formed from readily flexible material, such as of a suitable rubbery nature and may be formed either of natural or synthetic rubber compounds, appropriate synthetic resins of which various types are suitable, or the like. Preferably, the belt 118 may be of a composite nature, such as by being backed by a suitable woven fabric or the like to minimize stretching of the belt, and the major portion of the belt material is formed from the rubbery-like substance just referred to.

Molded upon the outer surface of such belts are a plurality of similar, closely spaced flexible fingers 126, the height of which in FIG. 2 is generally indicated by the diagrammatic line 128. The fingers 126 are spaced so closely together that when the belt is lowered with said fingers extending downward onto the rim of the holloware items, such as a tumbler, cup, ice tea glass or parfait, for example, there will be a sufficient number of said fingers frictionally grasping the inner and outer surfaces of the upper end of said holloware items that such item may be elevated by the belt, when moved vertically upward, even if the item is filled with liquid, for example.

Referring to FIG. 5, there is shown in outline form an exemplary upper end of a holloware item 130, such as an ice tea glass, the same being shown in elevation in FIG. 2 with a diagrammatically illustrated section of fingers 126 on belt 118 being shown in position to be lowered into engagement with the upper end of the item 130. Further, the length of the fingers, in actual practice, may be of the order of between ¾" and 1" so as to insure ample frictional surface capable of engaging the upper end portions of the rim of holloware items and insuring that the same will be elevated from the tray 10 upon which the same is positioned in upright manner as the trays are moved successively upon feed conveyor 74 through the various holloware removal units 20, 22, 24 and 26.

The elevation of the belts 118 is accomplished by operation of the motor 110 by which the frame 106 on each unit is reciprocated vertically in opposite directions. A cycle of such movement commences when the tray 10 is disposed fully beneath the lower course of the belt 118. The belt, incidentally, is substantially as wide as the length of the tray 10 and the fingers 126 extend over the entire outer surface of such belt.

Upon a tray 10 being fully disposed beneath the lower course of belt 118, the elevation of the belt is substantially as shown in exemplary manner in FIG. 2, wherein it will be seen that there is ample clearance for the tallest of the holloware items 130 to pass beneath said course of the belt. When said cycle is to commence, the motor 110 is energized in such manner as to rotate the crank arm 112 counterclockwise, in the direction of the arrow shown in FIG. 2 thereon, whereby the frame 106 initially is lowered to effect engagement between the fingers 126 and the upper end of the holloware item 130, all such items of that height upon a tray being simultaneously engaged by said fingers. Rotation of crank 112 is effected quickly, but not so quickly as to jerk the belt 118 with respect to the holloware items 130, for example.

Upon the rotation of the crank 112 passing through dead center and continuing to rotate counterclockwise, elevation of the frame 106, by which belt 118 is carried, is initiated and such elevation is extended to a height in which the lower ends of all of the holloware items 130 which are engaged by the fingers 126 on the belt will be disposed at a level above all of the remaining holloware items on the tray which are of less height than items 130 that have become engaged by the belt of the particular unit beneath which the tray 10 is being moved. In this regard, it will be understood that the removal unit 20 which is the first one encountered by a tray being moved by feed conveyor 74 has the frame 106 thereon adjusted to permit the belt 118 thereon to coact with holloware items of the greatest height. Correspondingly, each succeeding removal unit progressively is arranged so that the frame 106 thereon is at an elevation which will cause the belt 118 to coact with holloware items of the next lower height than those which were engaged by the immediate preceding removal unit.

When the belt 118 of each unit is lowered into engagement with the rims of holloware items upon a tray 10, the lowering movement is only of such magnitude as to permit effective engagement between the fingers 126 and the upper ends of the holloware items of that particular height for which the unit has been adjusted and even though the fingers 126 might be long enough to touch or slightly engage the rims of holloware items of the next lower height, such engagement is not sufficient to permit elevating the holloware items of next lower height when the frame 106 is elevated.

Upon the movement of the frame 106 to its highest possible elevation resulting from rotation of crank 112, such vertical movement is momentarily halted by a suitable programming switch or the like, not shown in detail, but of conventional type for such purpose, such programming switch also initiating operation of motor 132. A reducing gear box 134 is connected to motor 132 for purposes of driving a sprocket or pulley 136 around which an endless sprocket chain or belt 138 extends, the same also extending around a driven sprocket or pulley 140, which is affixed to one end of the shaft upon which drum 120 is mounted. Motor 132 may be mounted upon any appropriate part of frame 106, such as a vertical side plate 142.

When the motor 132 is activated by the control switch referred to above, the belt 118 will be moved a distance preferably slightly greater than the width of the tray 10 in order that all holloware items gripped by the fingers 126 of belt 118 will be moved from the farthest side of tray 10, to the side thereof nearest the chain or belt 138, and thus dispose the gripped holloware items 130 within an arcuate shroud 144 which is fixedly supported by the frame 106 and surrounds the drum 120. In the lower portion of said shroud, a horizontal shelf 146 also is formed, the same also preferably having a drain conduit 148 formed therein in order to pass spilled liquid to waste such as a sewer connection, not shown.

Upon the completion of the extent of movement of the belt 118 as described above, the control switch then is programmed to momentarily activate motor 110 again so as to partially lower the frame 106 and all of the above-described apparatus carried thereby such as the belt 118, the supporting drums therefor, and the shroud 144, as well as motor 132 and the like. Such lowering movement carries the frame and said apparatus thereon substantially to the level illustrated somewhat diagrammatically in FIG. 2.

When the next tray 110 is presented beneath the lower course of belt 118, the cycle described above is repeated and such repetition serves to move the previously engaged holloware items, which still remain frictionally secured to the belt 118 by fingers 126, around the axis of drum 120, whereby ultimately, the holloware items 130 are moved to a position where they are substantially directly above the axis of drum 120. It will be understood that the rotation of drums 120 and 122, so as to move belt 118 therearound, occurs only when the frame 106 is in its uppermost elevated position and when in this position, the upper course of belt 118 which is supported by the uppermost portion of drum 120 will be substantially in contact with the left-hand, leading end of stripping blades or fingers 150, as viewed in FIG. 2, which are supported by a horizontal plate 152 that is fixed, for example, to the upper transverse frame members 96 shown in FIG. 2.

When the foregoing arrangement is effected, as will be seen from FIG. 2, the leading ends of the stripping blades or fingers 150 are tapered and are sufficiently narrow to extend between the adjacent closely spaced rows of fingers 126, whereby the upper surfaces of the fingers 150 engage the lower surfaces comprising the open normally upper rims of the holloware items 130, which now have been inverted, and such rims slide along the fingers 150 and plate 152, toward the right as viewed in FIG. 2, by means now to be described. Preferably, the upper surface of the plate 152 and also the upper surfaces of fingers 150 are coated with appropriate self-lubricating type synthetic resins of which certain commercial types are sold under the trade name Delrin, Teflon, or otherwise.

It will be understood that the horizontal supporting plate 152 is as wide as the belt 118 of each of the holloware removal units. This is to enable the belt 118 to successfully engage all of the holloware items on an individual tray, regardless of the location of the items upon the tray, grip the upper rims thereof, and elevate them from the tray and also carry them horizontally past the trailing side edge of the tray and into the shroud 144. Accordingly, the stripping fingers 150 will be of adequate disposition to strip the gripped holloware items 130 from the belt 118 when said items are brought into engagement with fingers 150.

Several actuating and consolidating features operate with respect to the supporting plate 152 when the inverted holloware items are disposed thereon. These features are best shown in plan view in FIG. 3, to which attention is directed. Also supported by the upper frame members 96, for example, is a pair of bearings 154 between which a shaft and supporting roller 156 extend. Another pair of bearings 158, similarly supported as bearings 154 and transversely spaced therefrom, support another roller 160 similar to roller 156. Extending around said rollers is a friction belt 162, the lower course of which is disposed at a level capable of lightly engaging the uppermost surface of the inverted holloware items 130 disposed upon the horizontal plate 152 for purposes of moving the same, over the relatively friction-free surface of plate 152, toward the right as viewed in FIGS. 2 and 3.

Belt 162 is as wide as the belt 118 and plate 152. Accordingly, such movement of belt 162, which occurs continuously during the operation of the dishwashing machine, is effected by a motor 164, shown in FIG. 2, which drives a gear reduction unit 166 that is connected to roller 160, for example, to drive belt or apron 162 as aforesaid. Engagement of the uppermost surfaces of holloware items 130 by the lower course of belt 162 move the same into the vicinity of the adjacent portions of a pair of triangularly arranged, relatively narrow concentrating belts 168. Each of said belts extend around a series of three pulleys.

Each of said series comprises a driven pulley 170 and a pair of idler pulleys 172.

It will be seen from FIG. 2 that the level of the belts 168 is such as to engage the holloware items 130 intermediately of the heights thereof. Due to the relatively friction-free surface of plate 152, movement of the various holloware items upon the plate 152, as they engage the confining courses of belts 168 which terminate in narrow throat 174 shown in FIG. 3, as they move in the direction of the arrows also shown in said figure, results in the successive movement of such holloware items through the narrow throat 174 and into engagement with curved guide rail 176 so as to change the direction of movement of the holloware items 90° and thereby dispose the same between transversely spaced, parallel guide rails 178 as as shown in FIG. 3.

The concentrating belts 168 are driven by means of a single motor 179 provided with a drive shaft projecting from opposite ends thereof and each having a bevel gear on the outer ends of the drive shaft cooperating with similar bevel gears mounted on the upper ends of shafts 180 to which the pulleys 170 are fixed. By arranging the bevel gears as shown in FIG. 3, the belts 168 will be moved in similar directions along the opposite sides of narrow throat passage 174. Carried preferably by the uppermost shaft 180 as viewed in FIG. 3 is an indicia means in the form of a series of radially extending fingers 182 connected to a hub mounted upon said shaft 180 and rotated thereby. The fingers 182 are of sufficient length to extend across the narrow throat passage 174, as seen in FIG. 3, and engage the holloware items 130 intermediately of the top and bottom thereof, and thus insure movement of the items around the curved guide rail 176 into the straight path which extends longitudinally of the dishwashing machine and as defined by the guide rails 178. The items 130 are supported in inverted position for movement between said rails while supported upon conveyor 34.

When the holloware items 130 are inverted, such as while moving between plate 152 and the conveyor 34, a good opportunity is presented for purposes of removing any accumulated debris remaining in said items such as slices of lemon or napkins which have been wedged or pushed into the items as some thoughtless patrons are inclined to do occasionally. The present invention provides one appropriate means to facilitate the removal of such debris in the form of a suction head 186 located, for example, along the narrow throat passage 174 and so arranged that the open lower surfaces of the items 130 slidably move thereover. The suction head 186 is connected by a conduit 188 to a suitable source of vacuum, such as that which is connected to debris removal unit 50 and discharges into the same waste receptacle as unit 50. Other means may be employed if desired.

Further to insure desired movement of the holloware items 130 by the belts 168 and minimize the possibility of the items tiping upon plate 152, for example, while being moved by the belts, it will be seen particularly from FIG. 4 that suitable backing plates or strips 190 are supported by plate 152 and are disposed directly beneath and parallel to the angularly related courses of the belts 168 shown in FIG. 3 which lead to the narrow throat passage 174.

With reference to FIGS. 1A and 1B, it will be seen that the arrangement of the belts 168 with respect to holloware removal unit 26 corresponds to the arrangement shown in plan view in FIG. 3, whereas in the other units 20, 22 and 24, the parallel courses of the belts 168 which define the narrow throat passage 174 with respect to said units progressively are shorter between units 20 and 26, in order that the parallel belt conveyors 28, 30, 32 and 34 may be disposed adjacent each other and parallel, preferably within a substantially common horizontal plane in order to move the holloware items successively through the washing, sterilizing and drying compartments 36, 38 and 40 illuustrated diagrammatically in FIG. 1B.

Figure 31:
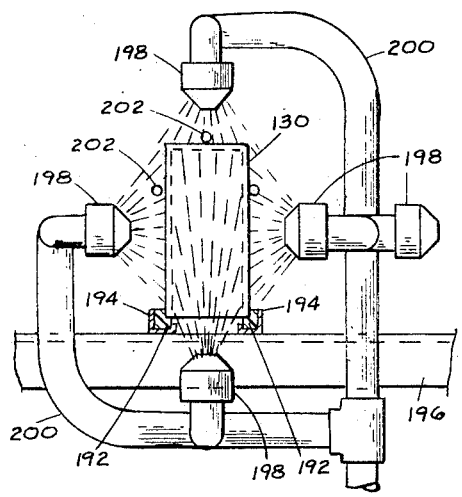
FIGS. 31 and 32 are fragmentary vertical elevations of exemplary details of washing spray units employed respectively for holloware such as glassware and cups of different heights.
Figure 32:
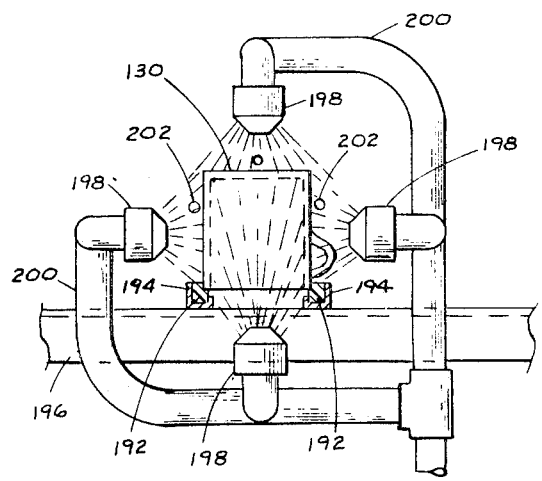

For illustration of the means for supporting and applying suitable sprays to the holloware items 130 while passing through the washing, sterilizing and drying compartments referred to, attention is directed to FIGS. 31 and 32 wherein two different heights of holloware items respectively are illustrated. By way of example, in FIG. 31, item 130 comprises an ice tea glass supported in inverted position between a pair of flexible, endless belts 192 which are supported upon suitable pulleys, not shown, appropriately to pull the belts along angular stationary guide rails 194 supported by appropriate transverse frame members 196 of the dishwashing machine and disposed within or between the various compartments 36, 38 and 40, as desired.

One of each of the pair of belts 192 moves slightly faster than the other in order to insure a gradual rotation of the holloware item 130 about its vertical axis while the inside and outside of the items are being thoroughly sprayed by a plurality of spray heads 198 which preferably are arranged in the exemplary manner illustrated in FIGS. 31 and 32. For example, in washing compartment 36, the spray heads 198 will discharge warm water and a suitable proportion of appropriate detergent or the like. It also will be understood that a series of sets of said spray heads 198 and the supporting and delivery conduits 200 are disposed in each of said compartments, in longitudinally spaced relationship as shown in FIG. 6, for example. In FIG. 31, it also will be seen that in order that adjacent conveyor lines may be served by a common conduit means 200, appropriate oppositely directed spray heads 198' may be mounted with respect to a spray head 198 and thus discharge against the adjacent parallel conveyor line which is not illustrated in the figures.

To insure that the holloware items 130, and particularly the taller versions thereof such as parfaits and ice tea glasses will not tip or fall while being moved along their paths by the belts 192, which are progressively engaging varying areas of the rim of the item 130, a plurality of parallel, stationary guide rails 202 are suitably supported respectively adjacent opposite sides of the holloware items 130 and also substantially centrally of the bottoms of said items which are uppermost as viewed in FIG. 1. The guide rails 202 preferably are formed of non-corroding material and offer no frictional resistance to the items 130 as they move with respect to the guide rails.

To further insure the removal of tenacious types of material such as lipstick from the rims of tumblers, cups and the like, it is contemplated that the washing facilities herein described may be either supplemented or replaced by rotating brushes or the like, and/or the use of ultrasonic cleaning units and apparatus.

Figure 21:
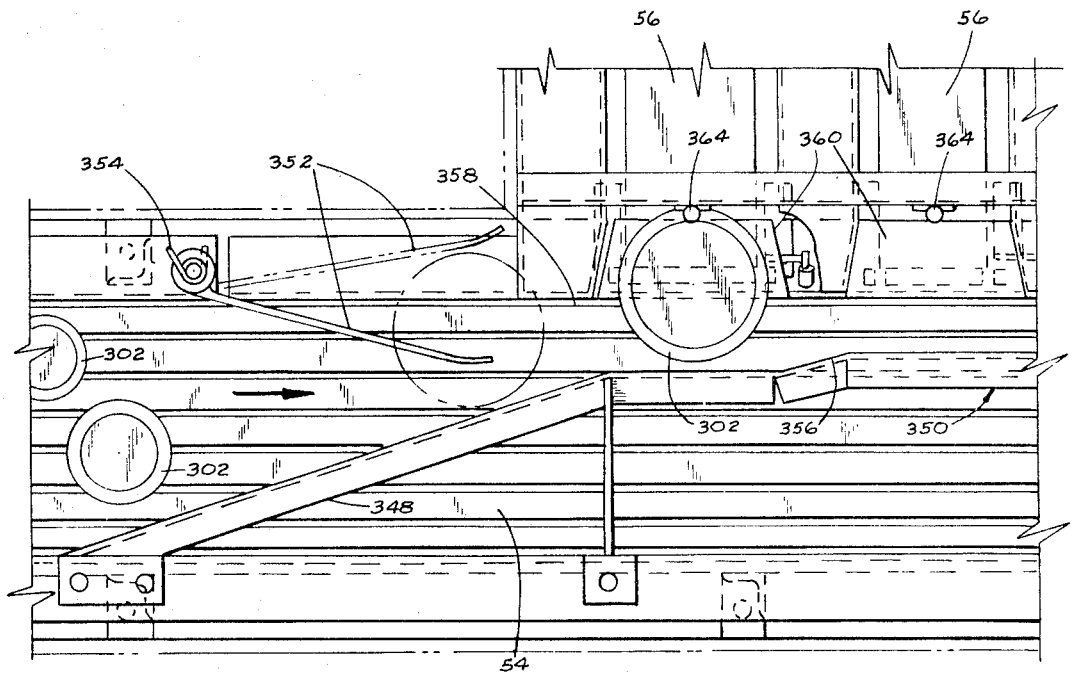
FIG. 21 is a fragmentary plan view of part of the mechanism shown in FIG. 20, as seen on line 21—21 of FIG. 20.

Referring to FIG. 32, wherein the holloware item 130 comprises a cup which is inverted and supported between the belts 192, it will be seen that the position and spacing of the guide rails 202 is slightly different from that shown in the arrangement of FIG. 21 for ice tea glasses, for example. Similarly, the transverse distance between the conveyor belts 192 as well as the stationary guide rails 194 therefor is different from that of the corresponding items in the arrangement of FIG. 31. Further, particularly in FIG. 32, it will be seen that preferably only a relatively short area of the side wall immediately adjacent the rims of the holloware items 130 are engaged by the flexible belts 192 and to insure this, said belts in cross-section may be somewhat L-shaped, as shown in FIGS. 31 and 32. Such arrangement is advantageous particularly with regard to permitting ready passage of the handles of the cups comprising the holloware items 130 shown in FIG. 32.

Figure 7:
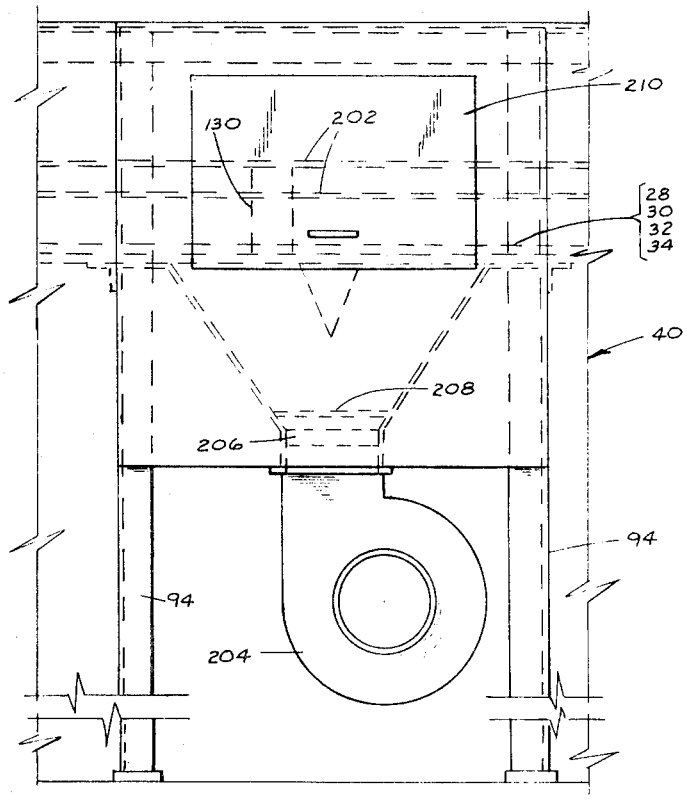
FIG. 7 is a side elevation of one of the holloware drying units generally as seen on the line 7—7 of FIG. 1B.

In the sterilizing compartment 38, it will be understood that the spray heads 98 will deliver, for example, a suitable rinsing solution of high temperature, for example, so as to insure sterilizing the items, while in the drying compartment 40, attention is directed to FIG. 7 in which, instead of the nozzle arrangement of the type shown in FIGS. 31 and 32, which are used in the washing and sterilizing compartments, an appropriate blower 204 is mounted in the lower portion of compartment 40 and is connected to the ambient atmosphere to take in air which is first passed through a filter 206, of suitable nature, the filtered air then being directed upwardly past heater elements such as electrical resistance members 208, one commercial type of which is sold under the trade name Calrod.

Such heating elements 208 are capable of generating sufficient temperature that when the required volume of air is passed therethrough from fan 204, the heated air is quite capable of quickly drying the washed and sterilized holloware items 130, one of which is shown in exemplary manner in FIG. 7. Further, if desired, an access doorway 210 may be formed in one side wall of the compartment 40 for any desired purpose, the same normally being closed by an appropriate door. After the dried holloware items are discharged from the exit end of drying compartment 40, they pass through appropriate assembly and storage means, details of which are best illustrated in FIGS. 1B and 8–11 and such details will now be described.

HOLLOWARE ASSEMBLY SECTION

Figure 9:
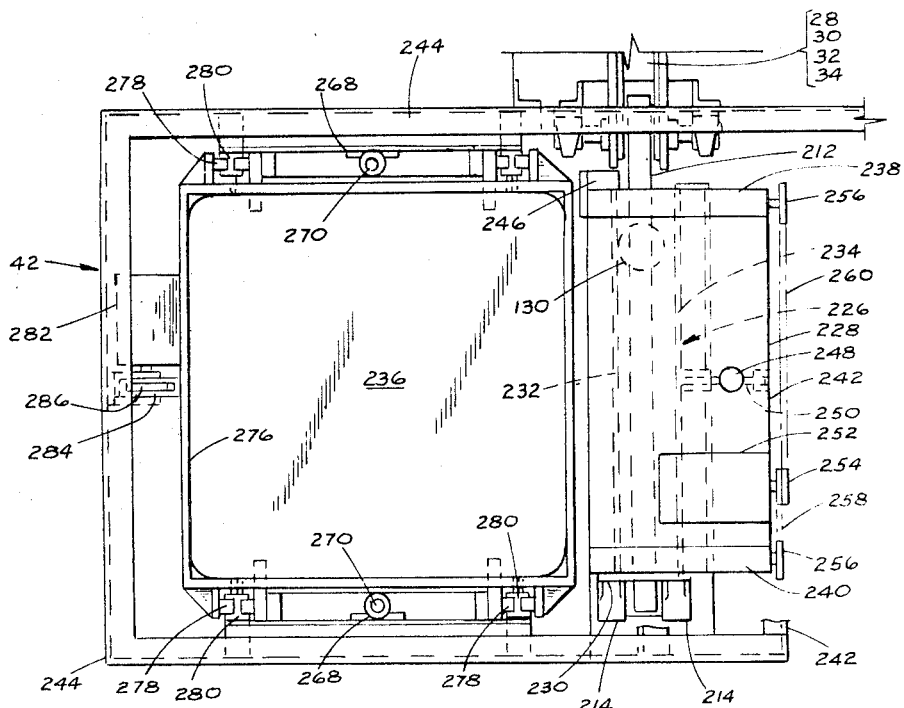
FIG. 9 is a plan view of the mechanism shown in FIG. 8.
Figure 8:
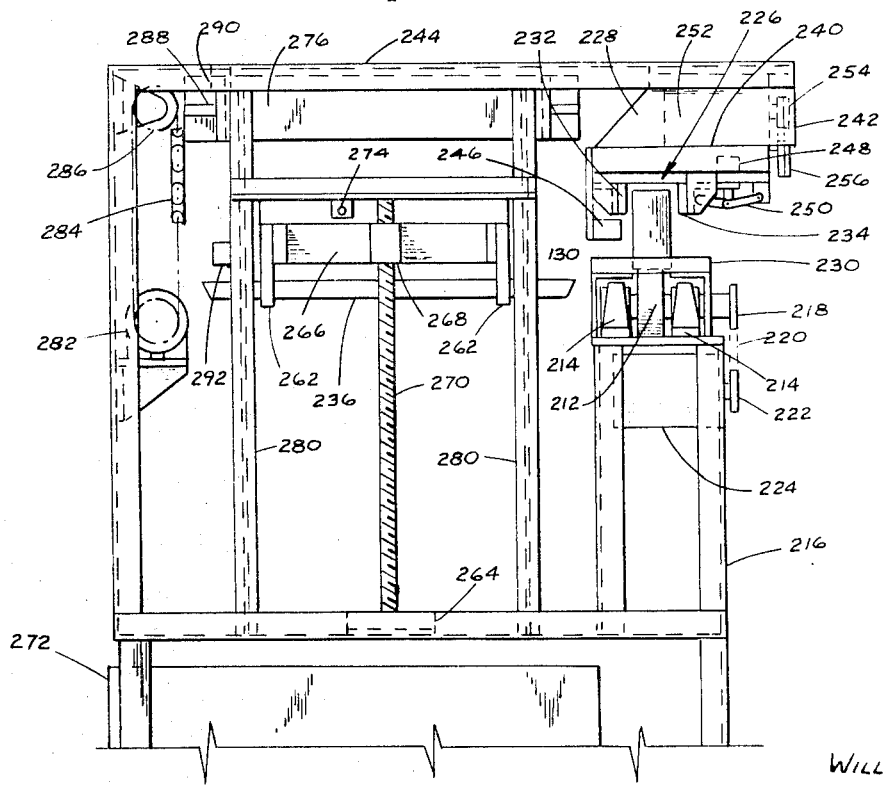
FIG. 8 is a rear vertical elevation of one of the holloware conveyor unloading units which receives dried holloware and collects the same for transfer to a storage tray, as seen on the line 8—8 of FIG. 1B.

The receiving compartment 42 is provided with a plurality of stacks of storage trays 44, as shown in FIG. 1B. One such stack of storage trays is provided for each of the belt conveyors 28, 30, 32 and 34, which actually comprise sanitizing conveyor means for the holloware. Referring to FIG. 9, wherein a fragmentary delivery end portion of each of the belt-type sanitizing conveyors are shown, the same are in alignment with relatively shorter, horizontal assembly conveyors 212 which are supported around a plurality of flat pulleys or rollers respectively mounted on shafts extending through bearings 214, the bearings being supported by appropriate frame means 216. One of the shafts has a sprocket gear 218 connected thereto and a sprocket chain 220 extends therearound as well as around a driving sprocket 222 fixed to motor 224, all as shown in FIG. 8.

The upper surface of the various assembly conveyors 212 preferably are coated with pliable synthetic resin or similar material of the self-lubricating type, several examples of which, without restriction thereto, are sold under the trade names "Teflon" and "Delrin." Extending across the leading end of the path traversed by the conveyors 212 in the various compartments referred to above, is a fixed stop 230 which may be in the form of a cross bar supported by the same frame which supports the bearings 214, for example. This determines the leading end of a row of the holloware items 130 which will accumulate upon the upper course of the conveyor 212.

The hollowware items 130, which are inverted as they are moved along on conveyor 212, are maintained in a straight line by the upper ends thereof being disposed within a channel 226 which is formed within an overhead frame 228. The channel is defined on one side by an elongated fixed clamping member 232 and an opposite, parallel movable clamping member 234. The members 232 and 234 may be lined with yieldable, compressible material such as foam plastics, rubber-like substances and the like so as to provide firm clamping engagement with the upper ends of the inverted holloware items 130 and also insure firm frictional engagement thereof inasmuch as the clamping members 232 and 234 also comprise transfer means by which a row of predetermined lengths of said holloware items 130 are moved onto a receiving tray 236, by means described hereinafter.

The overhead frame 228 is supported at its opposite ends by a pair of parallel, compound screw units 238 and 240 which are supported at one end of each by a downwardly extending end frame member 242 which extends between opposite overhead frame members 244 which are parallel to each other. In FIG. 9, the end frame member 242 has been mostly broken away to disclose mechanism appearing therebeneath.

The elongated movable clamping member 234 is supported in suitable guide means on overhead frame 228 to permit the same to be moved toward and from the fixed clamping member 232 a limited distance which is sufficient to firmly clamp the row of holloware items 130 therebetween after such row has accumulated upon conveyor 212 and is maintained in a straight row by the channel 226. As mentioned, the stop 230 determines the leading end of such row.

When the delivery conveyors 228, 230, 232 and 234 have delivered a sufficient number of holloware items to the assembly conveyors 212 of each compartment, to form a row of a desired number thereof, the trailing item 130 of said row, as viewed in FIG. 9, will be opposite an electric eye unit 246 which is of the type that does not function until the beam has been obstructed a predetermined period of time, as distinguished from the conventional type wherein instant actuation of the unit occurs when the beam is obstructed. Under normal conditions of operation, the passage of holloware items to the various conveyors 212 is sufficiently slow or infrequent that there is no need to provide a shut-off gate from the conveyors leading to the assembly conveyors 212 when such row of items has been completed upon said conveyor.

Upon the formation of the aforementioned row of holloware items 130 and electric eye 246 having functioned, a solenoid 248, which is in electrical circuit with electric eye unit 246, functions to operate a toggle mechanism 250 to project the movable clamping member 234 toward the fixed clamping member 232 and thus firmly clamp the accumulated row of holloware 130 therebetween. The control circuit for the electric eye 246 and solenoid 248 also is so arranged that it is connected to motor 252 and energizes the same to actuate the compound screw units 238 and 240 to project the overhead frame 228 toward the left, as viewed in FIGS. 8 and 9. Actuation of the screw units 238 and 240 is effected by means of a driving sprocket 254 on motor 252 and a driven sprocket on the shaft of each of the compound screw units 238 and 240. A sprocket chain 258 extends between driving sprocket 254 and one of the sprocket gears of the nearest driven sprocket gear 256 which is of the compound type to accommodate two sprocket chains. The other sprocket gear of driven sprocket 256 accommodates a transfer sprocket chain 260 which extends to the driven sprocket 256 of the distant compound screw unit 238 shown in FIG. 9.

The control circuit for the motor 252 also includes an appropriate counter unit, not shown, but of commercial type, by which it is possible to project and retract the overhead frame 228, toward the left, as viewed in FIGS. 8 and 9, a predetermined number of traverses, each one being a shorter distance than the previous one, commencing with the longest traverse which is sufficient to project an initial predetermined row of holloware items 130 onto receiving tray 236, adjacent the farthest edge thereof.

Upon each such traverse being completed, the circuit also is of the type which will de-energize the solenoid 248, thus releasing the accumulated row of holloware items 130 from between the clamping members 232 and 234, and permit the same to drop vertically a very short distance, which usually is not more than an inch, onto the surface of the tray 236. Such distance also is sufficient to permit the clamping members 232 and 234 to clear the top of such row of deposited items 130 when the overhead frame 228 is being returned to its starting position, as shown in FIGS. 8 and 9, to receive the next row of items 130 to be delivered thereto. The next traverse which will occur, however, will be a shorter distance than the previous traverse, as referred to above, the same being controlled by the counting mechanism thus mentioned, and each succeeding traverse being correspondingly of a shorter distance, such decrease in distance being equal to the diameter of the holloware items 130 being handled by the mechanism.

The counter mechanism continues to function until the last row of items 130 which is capable of being deposited upon the receiving tray 236 has been received thereby. The counter mechanism then automatically is restored to starting condition for arranging the next traverse of the overhead frame 228 to be for the greatest limit of travel and the cycle then repeats itself for the filling of successive receiving trays from an overhead storage supply thereof, to the receiving position shown in FIG. 8, in which said trays are supported by pairs of supporting fingers 262 until they are filled.

When a receiving tray 236 has been filled with its full complement of rows of closely assembled, inverted holloware items 130, regardless of whether they are water tumblers, ice tea glasses, parfaits, footed sherberts, or cups, the weight thus disposed upon the trays 236 automatically actuates a constant tension motor 264, one type of which is known in industry as a negator motor. Said motor actually functions as a brake to control the descending movement of the lowering frame 266 from which the supporting fingers 262 extend. At opposite sides of frame 266 threaded sockets are positioned so as to be complementary to the multiple lead threads upon the screws 270 which are connected to the negator motors 264, there preferably being one for each of the screws 270.

As seen in FIG. 8, a solenoid-operated pin 274 normally engages frame 266 to maintain it in supporting position when one tray is fully loaded, the circuit is such as to release the solenoid and permit the weight of the loaded tray to be imparted to the threaded sockets 268 and thus cause the screws 270 to rotate at a predetermined speed controlled by the constant tension motors 264. Such speed is preferably slow so as not to jostle the loaded holloware items while the loaded trays successively are disposed upon supporting means in a receiving unit 272.

The unit 272 is preferably of the type which has a receiving platform normally urged upward by biasing means responsive to accumulating weight and becoming increasingly resistant as the weight increases so as to maintain the uppermost receiving surface substantially at a constant level, regardless of whether that surface is a previously loaded tray or the receiving platform per se. Devices of this type are available commercially, one brand being known as a Lowerator. It is contemplated that the arrangement shown in FIG. 8 for purposes of receiving and loading the receiving trays 236 is sufficiently high that a substantial stack of a number of loaded trays may be disposed upon each other, vertically, with any appropriate receiving unit 272 and when loaded to a predetermined extent, the receiving unit 272 preferably is of the portable type and may be carefully wheeled from the receiving compartment 42 and replaced with an empty unit 272. A supply of receiving trays 236 is provided for each of the receiving mechanisms shown in FIGS. 8 and 9 respectively for each conveyor 28, 30, 32 and 34.

Referring to FIG. 10 in conjunction with FIGS. 8 and 9, the means for successively depositing individual unfilled receiving trays 236 upon the supporting fingers 262 now will be described. A stack of such trays are supported by a vertically movable frame 276. In each corner of said frame, as shown in FIG. 9, are guide means 278, preferably of an anti-friction nature, which operate relative to a rectangular arrangement of vertical guide rails 280 which are fixed with respect to frame 216. The vertically movable frame 276 is actuated by a motor 282 supported upon an appropriate bracket adjacent one side of frame 216, said motor being of the reversible type and operate the sprocket chain 284 which extends around an idler sprocket gear 286. A bracket 288 connects one side of frame 276 to a link of chain 284. Referring to FIG. 8 in particular, it will be seen that a pair of limit switches 290 and 292 are supported by one of the vertical guide rails 280, or any other appropriate stationary portion of the frame respectively for engagement by the vertically movable frame 276 to control the upper and lower extents of movement of said frame by the chain 284 as it is driven respectively in opposite vertical directions by the reversible motor 282.

Each cycle of movement of the frame 276 includes a downward movement and a return movement to the starting position shown in exemplary manner in FIG. 8. The limit switches 290 and 292 are in circuit with the solenoid switch 274, whereby, after a suitable time delay afforded by a relay or the like, not shown, in the circuit for said various switches, such as when the lowering frame 266 is restored to the position shown in FIG. 8 and the solenoid-operated latching pin 274 has re-engaged the frame 266, the motor 282 is energized to lower the tray supply frame 276 until it engages limit switch 292, at which time the lowermost tray in the stack is released and the frame 276 is restored to its storage position shown in FIG. 8, wherein it contacts limit switch 290 and stops the motor 282. Limit switch 292 is of the type which not only stops the motor 282, also reverses it.

When the tray supply frame 276 is in its lowermost position, the apparatus shown in FIGS. 11 and 11a function to release the lowermost tray 236. The releasing mechanism comprises cam means 294 which, preferably, are provided at opposite sides of the space within which the frame 276 reciprocates vertically. Such cam means, for example, may be fixed to the vertical guide rails 280 and each comprise a plurality of cam surfaces respectively engageable by cam follower rollers 296 carried by holding and releasing dogs 298 and 300. As will be seen from FIG. 11 in particular, and especially considering that there will be opposite pairs of such dogs respectively at opposite sides of the trays 236, the dogs 300 originally secure the lowermost tray 236 and thus support the entire stack in frame 276.

When the motor 282 is actuated to lower the trays within frame 276 so as to deposit the lowermost tray upon the supporting fingers 262, when the follower rollers 296 are brought into engagement with the cam surfaces 294, it will be seen that the follower rollers 296 on dogs 298 engage the projecting portion 294' of the cam means a predetermined distance above the lowermost position of the downward travel of frame 276, thus moving the clamping dog 298 counterclockwise to clamp the next to the bottom tray 236. Upon reaching the lowermost position of the downward travel of the frame 276, follower roller 296 on releasing dog 300 will engage the projecting portion 294' of the cam means and thus move the lowermost releasing dogs 300 clockwise to discharge the lowermost tray 236 and permit the same to drop a short distance into engagement with the supporting fingers 262, whereas cam followers 296 on the holding dogs 298 will retain the same in engagement with the next to the lowermost tray 236 which now will become the lowermost tray. With this arrangement established, the tray-supporting frame 276 will then be elevated by motor 282 and chain 284 to the normal, storage position shown in FIG. 8. As the tray-supporting frame 276 is elevated to the normal storage position, holding dogs 298 automatically disengage the tray stack and permit it to drop onto release dogs 300 and into position for the next cycle. The illustration shown in FIG. 11a will show the relative positions and coactions of the several follower rollers 296 with the cam surfaces 294 and 294'.

DISH AND SILVERWARE REMOVAL MEANS

Figure 12:
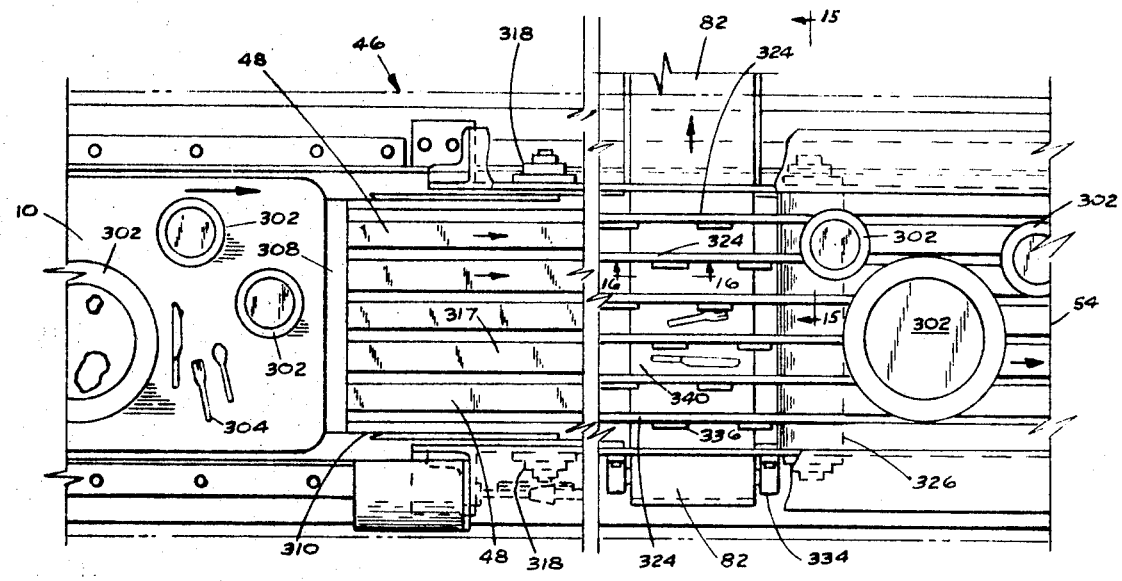
FIG. 12 is a fragmentary plan view of the feed conveyor showing mechanism for removing dish items and silverware from a tray and subsequent separation of silverware from the dish items.
Figure 13:
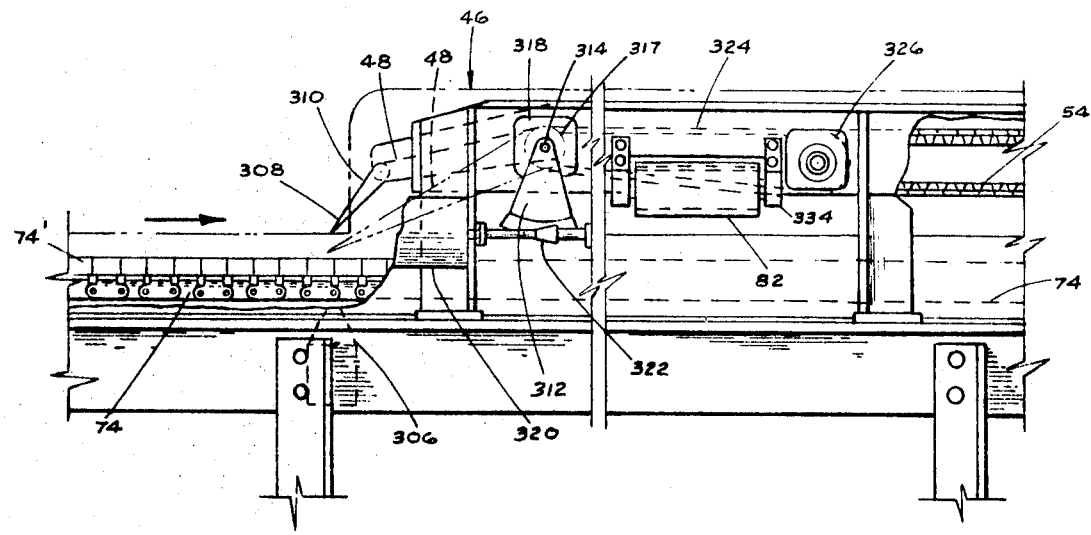
FIG. 13 is a side elevation of the mechanism shown in FIG. 12.

Referring to FIGS. 12 and 13, it will be seen that the feed conveyor 74 is conveying the trays in the direction of the arrows shown in said figure, after the holloware items have all been removed therefrom and only dish items 302, and silverware items 304 remain thereon. Further, the same are disposed thereon in the above-described one-high arrangement, i.e., all dishes and silverware are disposed upon a single layer thereof and no two items are stacked upon each other. It should be explained at this point that the feed conveyor 74, which preferably comprises an articulated chain, also is so-arranged that each link preferably has a plastic covering or cap member 74' affixed thereto.

As the feed conveyor 74 brings the trays 10 to the dish removal unit 46, which actually also includes means to remove the silverware, an electric eye control member 306 is reached by the leading edge of the tray 10. Upon this occurring, the leading edge 308 of transfer frame 310 is actuated by means, for example, of an arcuate segment of a worm gear 312 which is affixed to one end of shaft 314 to which one edge of the transfer frame 310 is affixed. The leading edge 308 of the dish-removal unit 46 comprises a blade-like member which is as wide as the trays 10 and is pivotally connected to the forward end of frame 310. The pivot also includes spring biasing means which normally tend to dispose the leading edge 308 downwardly with respect to the frame 310, approximately as illustrated in FIG. 13.

The spring biasing means is yieldable to permit the movement of the leading edge 308 of the transfer frame clockwise with respect to said frame, to dispose the same substantially in the phantom position thereof shown in FIG. 13, so as to position the leading edge 308 somewhat in sliding engagement with the upper surface of the bottoms of the trays 10 and thus facilitate the transfer of dish items 302 and silverware items 304 onto the transfer frame 310 which comprises a plurality of narrow endless belts 48, which are disposed in transversely spaced relationship with respect to each other and preferably are freely movable around the surface of the leading end of transfer frame 310, which is of a rounded nature, and the same also extend around a rotatable drum 317 supported upon a shaft mounted in bearings 318.

Upon the electric eye control member 306 being activated by the beam thereof being intersected by the leading end of a tray 10 upon which soiled dish items and silverware items are disposed, a motor 320 is energized momentarily in the direction to drive worm gear 322 which meshes with the segmental work gear 312 and is rotated in the direction to dispose the transfer frame 310 to the phantom line position thereof so as not only to remove the dish and silverware items from the tray 10, but also to elevate the same onto a series of very narrow, transversely spaced belt members which, preferably, comprise O-rings 324, which extend around the drum 317 and also around parallel pulleys 326 which are driven by the conveyor chain 54 engaging sprockets on the shaft of pulleys 326, so as to drive the same in order that the upper course thereof may move to the right as viewed in FIGS. 12 and 13.

In view of the mechanism described above, the leading edge member 308, which is relatively narrow, and is pivotally connected to the forward end of transfer frame 310, is projected under the advancing edges of the various dish items 302 and silverware items 304 within the trays 10 and actually serves to scoop them up, due to the advancing movement of the tray 10 with respect to the longitudinally stationary leading edge 308 and transfer frame 310, thus disposing the dish and silverware items upon the upper courses of the narrow belts 48 which are moving in the direction of the arrows shown in FIG. 12, thereby transferring the same to the upper courses of the parallel and transversely spaced O-rings 324, the upper courses of which are moving in the same direction as the belts 48.

Figure 16:
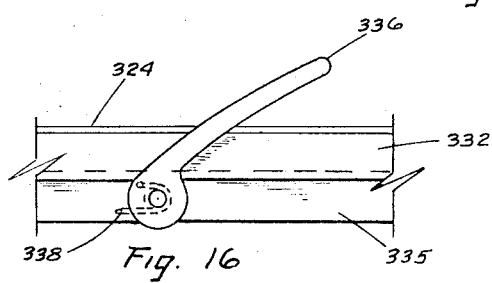
FIG. 16 is a fragmentary side elevation of a detail of the mechanism shown in FIG. 12, as seen on the line 16—16 therein.

Disposed beneath the O-rings 324 is a transversely movable silverware conveyor 82, of appropriate width, supported by drums at opposite ends thereof which are provided with shafts supported in bearings 334. The upper course of the silverware conveyor 82 moves in the direction of the arrow shown in FIG. 12. Also appropriately supported by bars 335, shown in detail in FIG. 16, which respectively are positioned parallel to and directly below the upper courses of the O-rings 324, are a plurality of silverware rearranging fingers 336 which are normally biased upwardly, to the position shown in FIG. 16, by springs 338 which have relatively low force. For example, inasmuch as the dish items 302 are also conveyed from the trays 10 by the belts 48 and O-rings 324, along with the silverware, the weight of even the lightest-weight dish item 302 is adequate to depress the fingers 338 and thereafter pass over the same. However, the force of the springs 340 is adequate to retain the fingers in elevated position when contacted by silverware items on the O-rings 324, for example, in transverse position thereon, whereupon the dragging effect afforded by the fingers 338 upon the silverware items is adequate to move the same to positions wherein the silverware items extend substantially parallel to the O-rings 324 and especially the spaces 340 between the O-rings so that the silverware items will drop onto the conveyor 332 and extend substantially transversely to the longitudinal axis thereof which is parallel to the directional arrows shown in FIG. 12, for example. Such arrangement insures the transfer of the silverware items from the O-rings 324 onto conveyor 82 for passage to sorting and sanitizing means.

Figure 19:
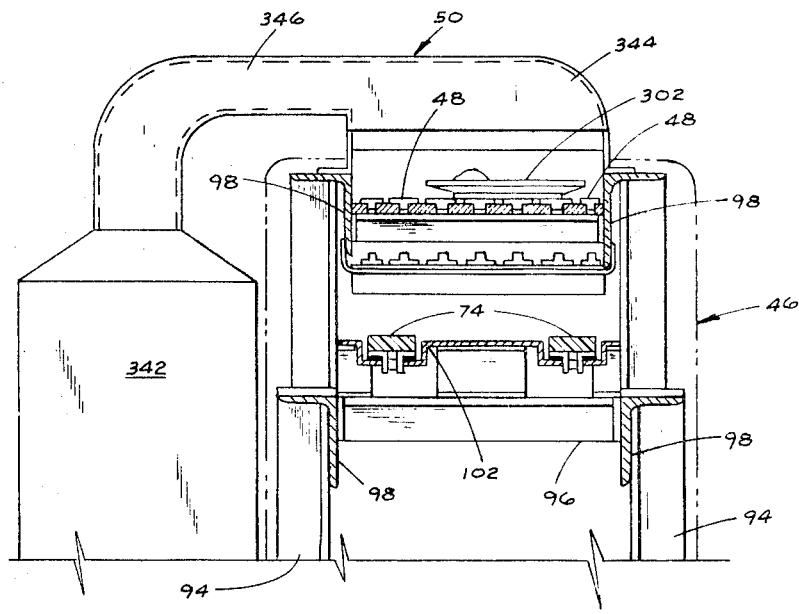
FIG. 19 is a vertical sectional elevation showing the waste removal means as seen on the line 19—19 of FIG. 1B.

The dishwashing system comprising the present invention also includes means to remove debris and excessive waste material particularly from the dishes while they are moving along the narrow belts 48 of the dish-removal unit. Such waste material as napkins, and especially paper napkins, cigar and cigarette butts, lettuce leaves and other salad remains, bones and the larger food particle remains are removed from the dishes by the debris-removal unit 50 which is shown somewhat diagrammatically in FIG. 1B and details thereof are shown to greater extent in FIG. 19. In said figure, a vacuum unit 342 of relatively high vacuum capacity is mounted adjacent one side of dish-removal unit 46, as shown in FIG. 1B. A suction hood 344 is sufficiently wide to extend entirely over the complete arrangement of narrow conveyor belts 48 of the dish-removal unit 46, as clearly shown in FIG. 19, and the exhaust 346 thereof communicates with the upper end of the vacuum unit 342.

Preferably, the unit 342 also embodies waste comminuting means such as appropriate grinding and pulverizing mechanism, certain types of which are sold under the trademark "Disposall," receive the evacuated material and pulverize the same to sufficient size to be discharged immediately to sewer. In communities where this is not permitted, other disposal facilities are available such as commercial devices which reduce the material to a pulp which is stored in large containers for removal and disposed in the same manner as municipal garbage. The negative pressure capable of being exerted by vacuum unit 342 is adequate to remove, by suction, substantially all of the extraneous, waste material remaining upon the dish items 302 and any other items being conveyed by the narrow belts 48, for example, even including masses of foodstuffs such as mashed potatoes, vegetables of various kinds, meat particles, and especially bones, thereby minimizing the contamination of the washing and rinsing solution through which the dish items and silverware ultimately pass, as described in detail hereinafter.

After the dish items and silverware traverse the debris-removal unit 50, and particularly after the silverware has dropped through the spaces 340 onto the conveyor belt 82 therefor, said dish items are passed to classifying conveyor 54 which receives them from the O-rings 324, while the trays 10, which have been emptied of all food and beverage-containing items by this time, remain upon the feed conveyor 74 and are carried thereby to the transfer conveyor 76 by which the same are transmitted to the tray-sanitizing conveyor 78 which moves them through the various sanitizing compartments 66, 68 and 70. At the time this occurs, the dish items have been elevated to the higher level of classifying conveyor 54 above the feed conveyor 74 and are in position to engage the classifying and separating mechanism 52 which primarily comprises a progressive and irregular cam 348, the general outline of which is best shown in FIG. 1B and various elements and features thereof are shown in detail in FIGS. 20 and 21, the latter being described as follows.

As the dish items 302 of various sizes and diameters move toward the right, in the direction of the arrows shown in FIG. 21, they initially are brought into engagement either with the introductory cam portion 348 of the generally overall, irregular classifying cam 350, or the yieldable shunting arm 352 which normally is spring-pressed to the full line position thereof shown in FIG. 21 but is capable of being moved, under pressure, and against the action of the biasing spring 354, or the equivalent, to the dotted line position shown in FIG. 21. The purpose of the shunting arm 352 is to insure that all of the dish items 302 will be moved into engagement with the introductory cam portion 348 as well as the various other graduated cam portions 356 of the overall classifying cam 350 in order to classify and separate the dish items according to size due to the functioning of the graduated cam portions 356, as follows.

The introductory cam portion 348 terminates a sufficient distance from the boundary edge 358 of classifying conveyor 54 to insure that the dish items 302 of largest size or diameter are moved to such position that their center of gravity is past the boundary edge 358 of conveyor 54, as illustrated in FIG. 21. This will dispose the major portion of both the size and weight of the dish items 302 onto pivoted shelf 360 which is co-planar with the classifying conveyor 54 and is supported in such position by a solenoid or fluid cylinder unit 362. The electrical or fluid circuit of the unit 362 is connected, for example, to an actuating control member such as an electric eye unit 364 which is so-positioned vertically above the outer edge of the dish items 302, as shown in FIGS. 20 and 21, that when the beam from the electric eye is interrupted by the perimeter edge of dish items 302, it will cause the cylinder unit 362 to contract and thereby move the shelf 360 clockwise through a limited acute angle of sufficient extent to tilt the dish items 302 upon the shelf downwardly, for reception upon the transfer conveyor 56 therefor, as shown in FIG. 20.

The dish items of lesser size or width than the largest size illustrated in FIG. 21 beneath the electric eye unit 364 are carried by the classifying conveyor 54 successively into engagement with the various graduated cam portions 356 which are dimensioned proportionately to the various intended diameters and sizes of dish items to be classified thereby. Such cam portions progressively move the dish items of successively smaller size and diameter over the boundary edge 358 of conveyor 54 and onto the pivoted shelf 360 for that particular size, whereby, when the means from the various electric eye units 364 are intercepted, the shelves will tilt and dispose the plate items respectively of smaller sizes upon the various transfer conveyors 56 therefor, thus effectively classifying all the dish items into respective size and shape categories for transfer to the sanitizing conveyor structures by which they are passed through the various sanitizing compartments by means of the detailed mechanism now to be described.

In order to conserve the size of the overall dish washing system shown in FIGS. 1A and 1B, it is preferred that wherever possible, either the principal longitudinally extending conveyors or the lateral, transfer conveyors and the like be of minimum length and width. To this end, the various transfer conveyors 56 are as short as possible, the same being supported around a plurality of drums 366 and 368, the latter being driven by means of an endless flexible member such as sprocket chain 370 which passes around a suitable sprocket gear fixed to drum 368 and also around a driving sprocket gear 372 fixed to the output shaft of a right-angle gear box 374 which is actuated by shaft 376 extending from one of the sprocket gears or the like around which the flexible, articulated movable sanitizing conveyor 378 extends, the shaft 376 being supported by a plurality of bearings 380.

Figure 20:
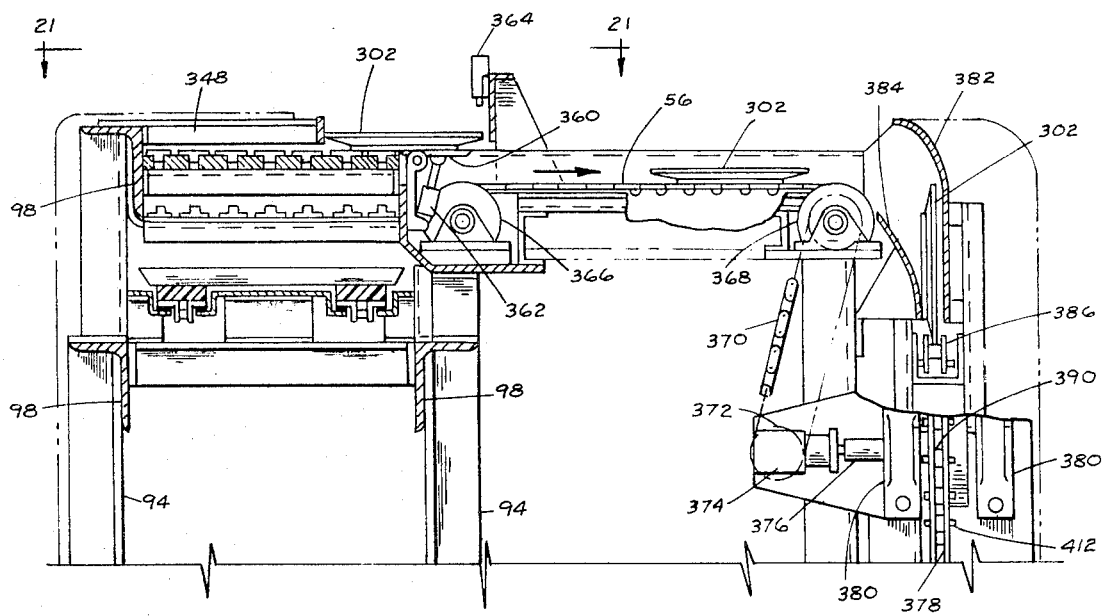
FIG. 20 is a rear vertical sectional view showing the dish transfer and classifying means, as seen on the line 20—20 of FIG. 1B.

From certain of the figures, and especially FIG. 20, it will be seen that the preferred position of the dish items 302 when being conveyed by the various sanitizing conveyor means 58, 60, 62 and 64 to the different sanitizing compartments 66, 68 and 70, is vertical. This is preferred with respect to conserving space, facilitating the operation of the cleansing and rinsing sprays, and also in facilitating the progressive engagement of different areas of the rim of the dish items while passing through such sanitizing compartments. To dispose the dish items 302 in such substantially vertical position, by referring to FIG. 20, it will be seen that as the dish items 302 are discharged from the right-hand end of the transfer conveyor 56, as viewed in said figure, the dish items move by gravity onto a curved deflecting plate member 382 shown in edge view in FIG. 20. A companion positioning member 384 is arranged with its lower portion parallel to the lower portion of member 382 so as to insure the substantially vertical positioning of the dish items 302 when received upon a horizontal portion 386 of the flexible movable sanitizing conveyor 378 which actually comprises part of the overall sanitizing conveyor means 58, 60, 62 and 64, depending upon the size or shape of the dish item being conveyed through the various sanitizing compartments.

Referring to FIG. 22, wherein an exemplary sanitizing conveyor means 58, 60, 62 and 64 is shown at least fragmentarily, it will be seen that the lower, flexible and articulated movable sanitizing conveyor member 378 is composed of a series of pivotally connected links, the alternate links comprising similar pairs of loop members having upstanding projections 388 thereon between which short pivot pins extend for purposes of receiving small sized rotatable positioning and impelling rollers 390 thereon. Between each pair of such rollers 390, the lower edge portion of a dish item 302 is received. Preferably, the rollers 390 are of suitable self-lubricating plastic material of which several commercial types are available under the trade names "Delrin" and "Teflon." If desired, the perimeters of the rollers 390 may be grooved.

Figure 33:
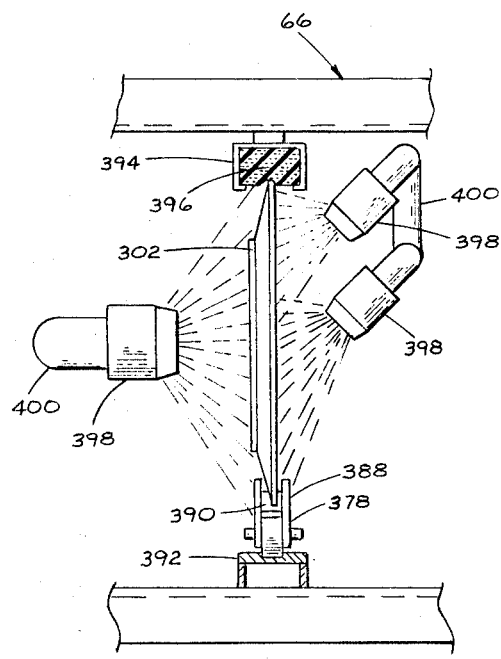
FIG. 33 is a fragmentary vertical elevation of an exemplary washing spray unit for dishes.

In view of the flexible nature of the movable sanitizing conveyor 378, particularly during the horizontal traversing sections thereof, the same slides movably along the upper face of an inverted supporting channel 392, as seen in cross-section in FIG. 33 and in side view in FIG. 22. Cooperating with the movable sanitizing conveyor 378 and spaced evenly therefrom in vertical disposition thereover is a stationary guide member 394 which, in cross-section, as shown in FIG. 33, is channel-shaped, the channel opening downward toward the flexible conveyor 378. The channel 394 also preferably contains a grooved, elongated yieldable member 396 which may be of a rubber-like substance and preferably one which is long lasting, especially in washing and rinsing solutions of the type employed in commercial types of dishwashing machines, as well as in the drying compartment of the present invention.

The material from which the member 396 is formed also preferably exerts a reasonable amount of friction whereby, as the movable conveyor 378 moves in the direction of the arrow shown in FIG. 22, for example, the upper rim portions of the dish items 302 are stationary momentarily where they tangentially engage the groove of member 396, such dish items actually rolling with respect to member 396 and its supporting channel 394. This is made possible by reason of the rollers 390 carried by the alternate links of the movable conveyor 378, whereby the rims of the dish items roll upon the rollers 390, the result being that progressively changing rim portions of the dish items 302 are the only parts thereof engaged by the relatively stationary and movable members of the santitizing conveyor means. If desired, means which do not rotate the dishes in transit may be used rather than the foregoing.

When the dish items are introduced to the flexible conveyor member 378 as they slide downwardly between deflecting and guide members 382 and 384, they initially are received upon a suitably extending portion of the flexible conveyor member 378 which comprises the entrance portion 386 thereof shown in FIG. 20. The dish items move a short distance upon a horizontal extent of such entrance portion 386, at which location the entrance end of the stationary guide member 394 of such conveyor means commences and the upper and lower rim portions of the plate items are both engaged to insure firm and accurate support of the plate items, in substantially vertical position, as the same progressively move through the washing compartment 66, sanitizing compartment 68, and drying compartment 70, for example. It will be understood also that other compartments, if desired, may be added, such as those in which the dish items may be pre-rinsed, or any other desired functions may be accomplished in accordance either with sanitary code requirements, desires of the institution, or otherwise.

By way of an exemplary arrangement of such compartments, as indicated above, only washing, sterilizing and drying compartments are illustrated in detail. The same are somewhat diagrammatically shown in side elevation in FIG. 23 and in plan view in FIGS. 1A and 1B.

Figure 23:
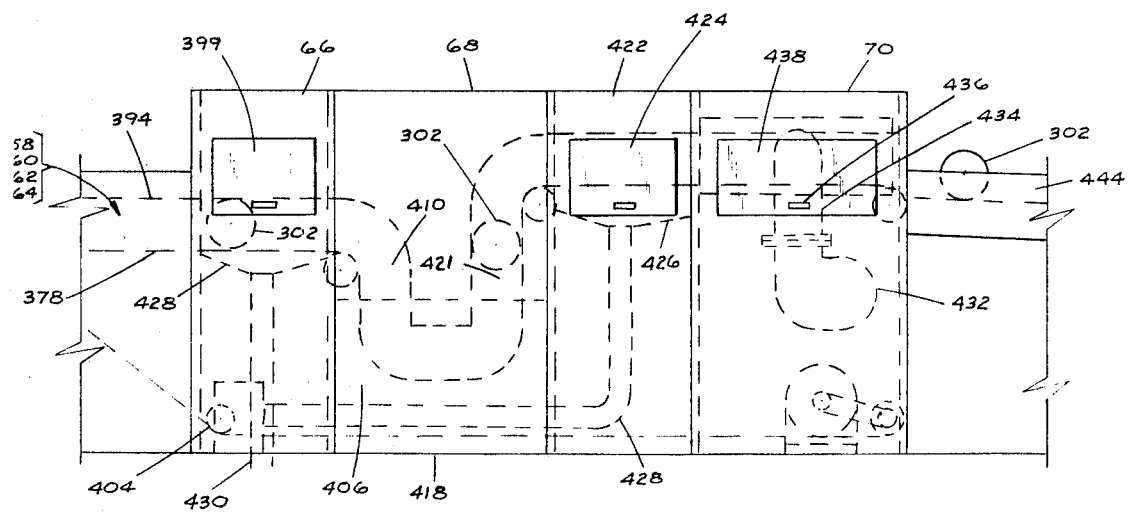
FIG. 23 is a diagrammatic side elevation of the pre-wash, ultrasonic cleaning, sterilizing and drying sections for the dish items illustrated on a smaller scale than used in FIG. 22.

Referring particularly to FIG. 23, attention is directed to the washing compartment 66 for the dish items, in which an exemplary item 302 is illustrated in phantom. Said compartment is provided with an access door 399. Referring particularly to FIGS. 22 and 33, it also will be seen that horizontally disposed banks of spray heads 398 are connected to and supported by a plurality of washing solution conduits 400 which, in turn, are connected to a supply pipe 402 leading from washing solution pump 404 which develops substantial pressure in order to direct washing sprays from the heads 398 respectively adjacent opposite surfaces of the vertically disposed dish items 302 as they pass along the path therefor in the washing compartment 66. Further, it will be seen from FIG. 33 that the nozzles 398 at the right-hand side of the figure, which wash the inner surfaces of the dish items 302, are directed downwardly and, as explained hereinabove, the dish items are continually rotated, slowly, about their axes, as they traverse the washing compartment, whereby all rim portions of such items are washed during the course of movement through the washing compartment.

Preferably, the sprays delivered from the nozzles 398 are heated and the solution comprises water and appropriate detergent. This, coupled with the force of the sprays as created by the pump 404, is highly adequate to completely wash all surfaces of the dish items 302 thoroughly. Further, the speed at which the sanitizing conveyor means move the dish items through the washing compartment 66 is sufficiently slow that the period within which each dish item is in the washing compartment is fully adequate to insure complete washing thereof to remove all extraneous material therefrom.

If desired, the compartment 66, rather than serving primarily as a washing compartment in which detergent is employed in the spray, for example, may be used as a pre-rinse compartment wherein, for example, heat and water, either with or without detergent, may be employed to remove at least most of the readily removable soil and other accumulated material upon the dish items, prior to the items moving into what has been designated the sterilizing compartment 48, in which an ultrasonic bath 406 is disposed at a level below the diagrammatically illustrated upper surface line 408 shown in FIG. 22. To accomplish this, the dish items move down a vertically directed portion of the sanitizing conveyor as shown in FIG. 22. In this portion, the flexible conveyor 378 is provided with oppositely directed guide pins 412, see FIG. 20, which are disposed in approriate arcuate guide grooves in guide channel 414. The channel 414 is provided with an appropriate flared entrance end 416 to insure engagement of the guide pins 412 within the grooves therefor in the guide channel 414. The terminal end of guide channel 414 merges with an additional horizontal section of supporting channel 392, as clearly shown in FIG. 22, upon which the flexible conveyor 378 slides.

The stationary guide member 394, which engages the upper edges of the dish items 302 while being conveyed through the various compartments by the flexible conveyor 378, is appropriately curved and otherwise shaped, such as a long horizontal straight line, appropriately to correspond to the shape of the supporting and guide means for the flexible conveyor 378, in regard to all of the compartments, thereby insuring adequate support and guided movement of the dish items 302 through all of the compartments to the sanitizing equipment.

In order to render the bath 406 ultrasonic in nature, the interior of the tank 418 is provided with a plurality of transducers 420 of appropriate capacity and intensity, as well as frequency, to produce a desired cleansing effect upon all of the dish items 302, thereby removing any remaining traces of soil or stain, such as lipstick and other substances which usually are removed only with difficulty. Accordingly, when the dish items 302 have passed through the ultrasonic bath 406 and have been elevated along the vertically upward portion 421 of the sanitizing path for such dish items, such items will drain while vertically moving along said path and incident to the same moving to a rinsing and sterilizing compartment 422, shown in FIG. 23, which has a suitable access door 424, containing appropriate rinsing sprays, which utilize, for example, clear, hot water, such sprays being similar, for example, to the spray means shown in FIG. 33 if desired.

The aforementioned spray solutions drain into an appropriate sump 426 and pass therefrom into a conduit 428 which leads to pump 404, where, if desired, appropriate detergent may be added for delivery of the same to the spray heads 398 in washing compartment 66, thereby conserving water consumption as much as possible. In preferred practice, however, the washing compartment 66 employs a sump 428 which has a drain 430 preferably leading directly to a sewer in view of the amount of waste material which usually is contained in the wash solution draining into sump 428 from the spray nozzles. Economy usually dictates that it is less expensive, coupled with sanitary conditions in general throughout the various compartments, to direct such washing solution drainage directly to sewer rather than attempt to clarify the same or filter it. Concerning the ulrasonic bath 406, a certain amount thereof will remain in the surfaces of each of the dish items passing through such bath, whereby it will be necessary over a period of time to add makeup solution to such bath, but this requires very little effort or attention.

After the dish items have passed through the rinsing compartment 422, they enter the final sanitizing compartment 70 in which they are dried. The drying apparatus may be similar to that illustrated in FIG. 7 which specifically has been described above in relation to means to dry the holloware items. Essentially, the compartment 70 contains a blower 432 which directs air upwardly through a conduit 434, past appropriate heating elements 436 which may be of an electrical resistance nature and the air thus heated is discharged upwardly through shroud means 438, or the like, which partially blows excess water from the dish items and also heats them adequately to quickly dry the same, whereby when the dish items reach exit conduit 440, they are substantially dry.

Figure 25:
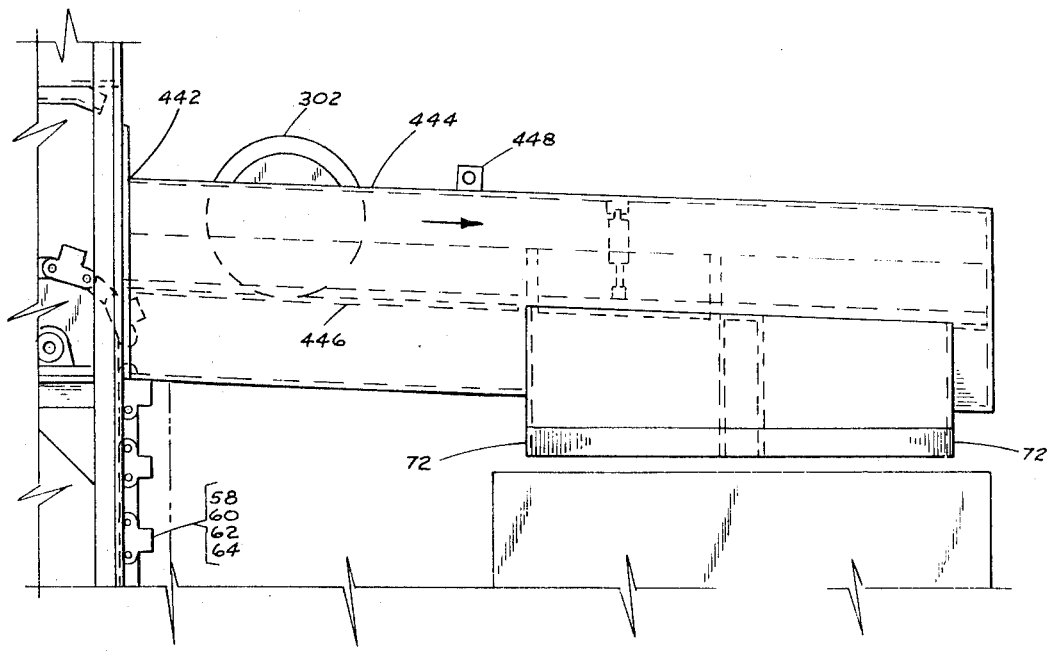
FIG. 25 is a side elevation of the mechanism shown in FIG. 24.

The sanitizing conveyors 58, 60, 62 and 64 by which the dish items 302 are conveyed through the various sanitizing compartments 66, 68 and 70, for example, preferably terminate adjacent the discharge opening 442 in the drying compartment 70. The dish items 302, while still in substantially vertical position, are supported by a narrow chute 444, the bottom 446 of which is inclined slightly downward, as shown in FIG. 25, in order that the dish items 302 readily may roll from the discharge opening 442 toward the first of a pair of receiving means 72. Adjacent one side of the chute an automatically operable counter unit 448 is mounted to serve as a control means for operation of the solenoid 450. The counter unit 448 may, for convenience, by way of example, comprise an electric eye coupled with an appropriate accumulator means arranged to operate a relay or otherwise after a predetermined number of dish items 302 have moved therepast. When such predetermined number have moved past the counter unit 448, it functions automatically to actuate the solenoid 450 with the following results.

Figure 24:
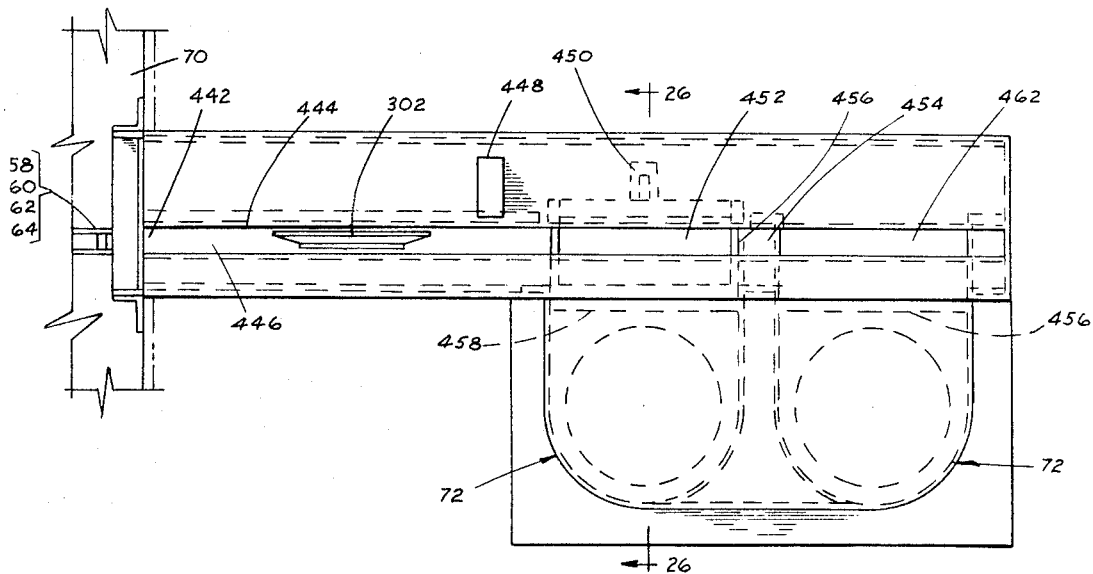
FIG. 24 is a fragmentary plan view of a dish unloading unit for dishes of a uniform size to dispose the same in storage means.
Figure 26:
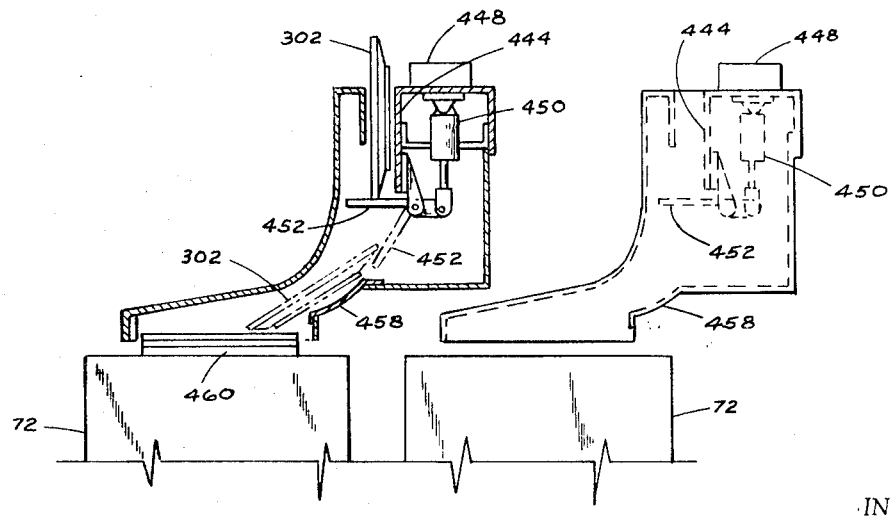
FIG. 26 is a front elevation of a pair of dish unloading units of the type shown in FIGS. 24 and 25, one of said units being shown in vertical section as seen on line 26—26 of FIG. 24.

It will be seen particularly from FIGS. 24 and 26, especially the latter, that a pivoted gate member 452 normally is maintained by mechanism in the solenoid 450, such as a spring, in the lowered angular position thereof shown in phantom in the left-hand figure of FIG. 26. Upon actuation of solenoid 450, however, under the circumstances described above, the gate member 452 is elevated to the horizontal, full line position thereof shown in FIG. 26 in the left-hand unit of said figure, whereupon it constitutes a continuation of the bottom 446 of chute 444. A further extension 454 extends beyond the gate member 452, as seen in FIG. 24.

When the mechanism described just above is arranged with the gate member 452 in lowered position as shown in FIG. 26, there is a slot 456 in the bottom 446 of chute 444. Under such circumstances, when a dish item 302, while rolling down the inclined bottom 446 of chute 444 reaches said slot, it drops therethrough and engages a curved guide plate 458 which somewhat forms a continuation of lowered gate member 452, and operates to skid to the plate member 302, by gravity, onto the top of a stack of plate items 460 which are disposed within a wall formed in one of the receiving means 72. Plate items in said stack 460 are of identical size to that of the plate item 302 being discharged onto said stack. As described above, the receiving means 72 is of the type having a vertically movable receiving member, not shown in detail, counter-poised within a wall of appropriate diameter within receiving means 72 and operating in a manner to maintain the top of a stack of dish items substantially at the level shown in the left-hand unit in FIG. 26, regardless of the height and weight of the stack of dish items supported thereby. One commercial type of such receiving means is sold commercially under the trade name "Lowerator."

After a predetermined number of such dish items, as determined by the counter mechanism 448, have moved therepast, the solenoid 450 is actuated as referred to above, to elevate the gate member 452 to the full line position thereof, as shown in the left-hand figure of FIG. 26, in which position it closes the slot 456 and forms a continuation of the bottom 446 of chute 444. Under such conditions, subsequent plate items 302 rolling down the chute remain in the chute until the second slot 462 is reached, as shown in FIG. 24, whereupon the dish items descend through the same, by gravity, onto the curved guide plate 458 which leads to the second receiving means 72.

The dish items thus discharged into the second receiving means are stacked therein until a predetermined number have been received, as determined by the counter unit 448, whereupon a signal is given either visual or audible, not shown, to notify an attendant that both compartments of the receiving means 72 are full and need to be replaced by an empty unit. To accomplish this, the preferably double unit of receiving means 72 is portable and readily movable over a supporting floor surface. Under normal operating conditions, the units 72 fill only at a moderately fast pace even when so-called rush hour conditions exist. Accordingly, it is possible for the attendant 18 to replace the filled receiving means 72 with an empty one, particularly as seen from FIG. 1A, the area within which the various receiving units are disposed is adjacent the arranging station 16 where the attention of the attendant 18 normally is required.

Particularly from the illustration of the left-hand unit in FIG. 26, it will be seen that the slope of gate member 452, in lowered, phantom position, is in smoothly sloping cooperative position with respect to the curved guide plate 458 to facilitate the general changing of position of the plate items from vertical to horizontal onto the top of the stack 460 thereof. Gate member 452 is disposed at an obtuse angle thereto. Accordingly, the gate member 452 serves the double function of comprising a continuation of bottom 446 of chute 444, when in its elevated position, while in its lowered, phantom position shown in FIG. 26, it constitutes a continuation of guide plate 458.

It will be understood that each of the sanitizing conveyor means 58, 60, 62 and 64, for example, respectively conduct a different size of dish items through the sanitizing compartments 66, 68 and 70, for example, and leads to its own discharge chute 444 as shown diagrammatically, at least, in FIG. 1A. However, the sanitizing conveyor 64 is intended to conduct a plurality of only slightly different sizes of dish items, which differences actually are too slight to readily be detected by the classifying and separating cam means 350 of the classifying and separating unit 52. For example, there are certain sizes of salad plates, bread and butter plates and saucers which differ in diameter by only a matter of a very small fraction of an inch, yet the vertical or transverse sectional shapes of these dishes is different. Also, as another example, a bread and butter dish is more flat than a saucer which is somewhat curved to a greater extent than a bread and butter dish. Accordingly, the present invention contemplates a more refined type of size-detecting and separating mechanism with respect to the exemplary santizing conveyor 64, for example, than is afforded by the mechanism of the classifying and separating unit 52. Details of such more sensitive and highly refined classifying and separating means are illustrated best in plan view in FIG. 27 and also in vertical sectional view in FIG. 28. The description of the details of said mechanism is as follows.

Figure 27:
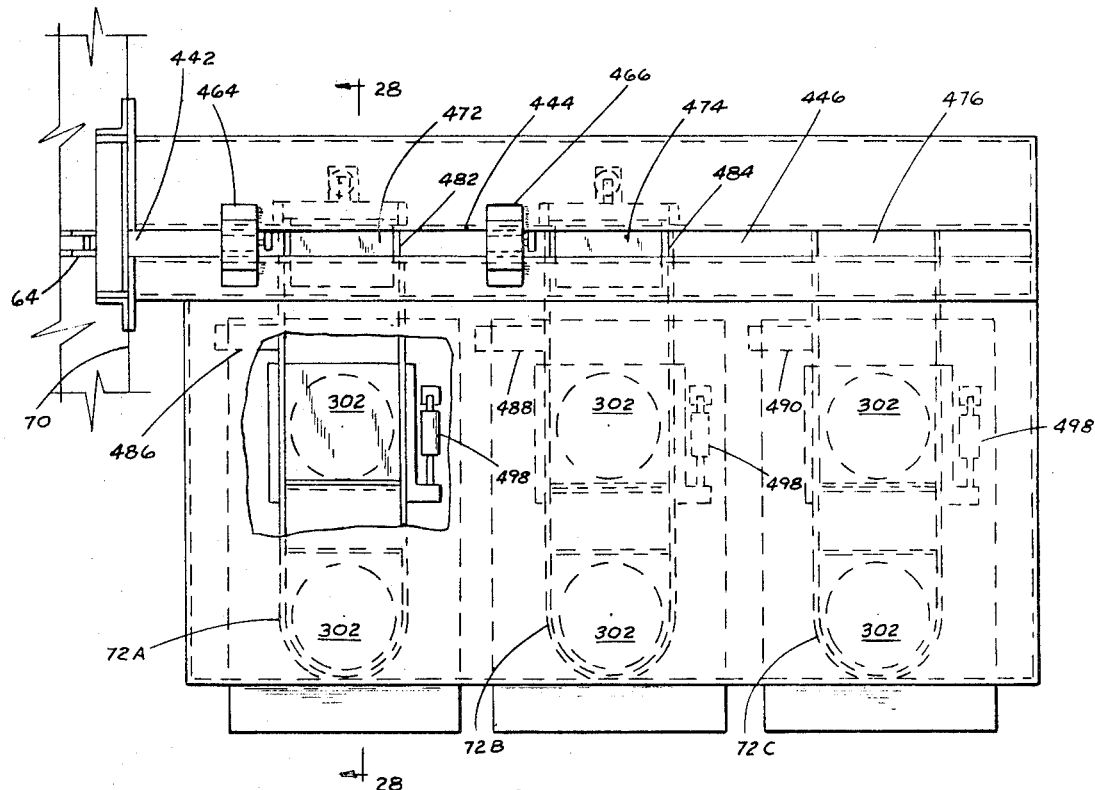
FIG. 27 is a fragmentary plan view of a dish unloading unit for dishes of several different sizes to dispose the same in storage means, said view being partly broken away to show details.

From FIG. 27, it will be seen that the sanitizing conveyor 64 terminates adjacent the left-hand end of the apparatus shown in said figure, immediately adjacent the discharge opening 442 in the end wall of the drying compartment 70, for example. A chute 444 continues outward from the discharge opening 442, as in regard to the mechanism shown in FIGS. 24 and 25, the same having a gradually sloping bottom 446 therein. Extending over the upper portion of the chute 446 is a plurality of bridge-like supporting brackets 464 and 466. Supported by the under surface of the brackets 464 and 466 is a very sensitive micro-switch 468 which has an actuating plunger 470 depending therefrom.

The lower level of the plunger 470 in each of the switches preferably is capable of being adjusted to a very precise dimension, each of the respective dimensions for the plungers on the several switches being different by a small amount. Further, the force required to actuate the plungers 470 of said switches is of a minimum amount, whereby as the dish items 302 of the critical dimension sizes referred to above roll down the chute 444 and pass under the first bracket 464 and moves beneath the actuating plunger 470 of the switch therein, the dish item will rollover the horizontal, pivotally supported gate member 472, which functions similarly to the gate members 452 described above and illustrated in FIGS. 24 and 26. If the dish item continues to roll beneath the second supporting bracket 466 and does not engage the lower surface of the actuating plunger 470 of the switch supported thereby, the dish item will roll over a second horizontal, pivotally supported gate member 474 and continue on the slot 476, through which the plate slides and engages downwardly curved guide member 478, a side elevation of which is shown in FIG. 28.

In the event the diameter of a dish item 302 is sufficiently large to actuate the plunger 470 of the switch 468 of either the first supporting bracket 464 or the second supporting bracket 466, depending upon the difference in sizes, said switches respectively are connected to a solenoid 480 which normally operates to maintain the bridge members 472 or 474 connected thereto in horizontal, full line position as shown in FIG. 28. However, upon the solenoid 480 being actuated, it lowers the gate member 472 or 474 to the downwardly extending, angular position shown in phantom in FIG. 28, in which position the same is substantially a continuation of the curved guide member 478 and thereby facilitates the gentle sliding movement of the dish item 302 downwardly onto one of the stacks of the compound type of receiving means 72.

From the foregoing, it will be seen that the capability of the micro-switches 468 resulting from the possibility of very closely and finely adjusting the position at which the actuating plunger 470 of each may be engaged by the rim of dish item, results in the mechanism being capable of distinguishing between very close size differences, especially in diameter of the various dish items intended to be received and segregated by said mechanism shown in FIGS. 27 and 28. Further, by reference to FIG. 27, it will be seen that each of the gate members 472 and 474 operate respectively to close discharge slots 482 and 484 which are at spaced intervals in the bottom 446 of chute 444, said slots respectively leading to the receiving means 72A, 72B and 72C, each of which preferably are of a duplex nature, i.e., having a plurality of wells therein respectively to receive a similar stack of a predetermined number of dish items, all of the same size.

For purposes of enabling the receiving means just described to first fill one of the wells with a predetermined number of dish items and then fill the second one with a corresponding number thereof, by reference to FIG. 27, it will be seen that a series of counter units 486, 488 and 490 respectively are mounted adjacent the openings 482, 484 and 476 in the bottom of chute 444. The counters are so positioned that the sensitive element thereof, such as an electric eye, will be intersected by the passage of a dish item down through the openings in the bottom of the chute 444 associated with the particular counter unit for any of the duplex-type receiving means. Referring to FIG. 28, the curved guide members 478 associated with the respective receiving means have removable deflecting member 492 arranged when in one position, as shown in full lines in FIG. 28, to cover the nearest well 494 in receiving means 72 shown in FIG. 28, whereby all dish items 302 will be received upon the top of the stack being formed in the distant well 496. Said wells, incidentally, contain the same type of counterpoised receiving means as described above with respect to the wells of the receiving means 72 shown in FIGS. 24 and 26.

After one of the counter units 486, 488 or 490 have been actuated by a predetermined number of dish items moving therepast, said counter units, which are in circuit with a suitable solenoid 498 function to actuate such solenoid and elevate the deflecting member 492 to the dotted line position thereof shown in FIG. 28, whereupon the dish items thereafter will become stacked within the well 492 until a predetermined number have been received thereby, after which the counter unit associated with that particular receiving means will operate an appropriate signal, such as described above with respect to the mechanism of FIGS. 24 and 26, to summon an attendant who will replace the filled receiving means 72 with an empty one.

After the trays 10 have been cleared of holloware items, dish items and silverware, as described above, they are conveyed by the main feed conveyor 74, toward the right-hand end of the machine as viewed in FIG. 1B, whereupon they are shifted to a lateral transfer conveyor 76. The mechanism for accomplishing such shift is illustrated in FIGS. 29 and 30. Referring to FIG. 29, when the tray is moved to the end of conveyor 74, it engages the actuating member of a switch 500 which is connected in circuit with a solenoid 502, the plunger of which is connected to a toggle arrangement 504 which elevates a pair of parallel, transversely spaced elevator bars 506 which are guided for vertical movement by short guide piston members 508. The elevator bars 506 are disposed adjacent the lower surface of the upper course of a pair of transfer conveyor belts 76 which are sufficiently flexible that when the solenoid 502 is actuated, it will elevate the upper courses of the transfer belt 76 a slight distance to a location slightly above the upper surface of conveyor 74, whereupon the bottom of the tray 10 will be engaged and moved toward the right as viewed in FIGS. 29 and 30.

Each of the transfer conveyor belts 76 cooperate with a similar pair of adjacent conveyor belts 510 by which the trays are elevated as shown in FIG. 30 until the center of gravity thereof passes over the guide roller 512, whereupon the trays engage and slide down the curved guide plate 514 to dispose the lower edge thereof upon the upper surface of the upper course of the sanitizing conveyor 78. Said conveyor conducts the trays 10, while supported vertically, through the various compartments 66, 68 and 70.

Figure 34:
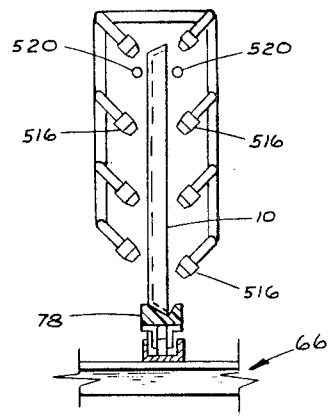
FIG. 34 is a fragmentary vertical elevation of an exemplary washing spray unit for trays.

While in the washing compartment 66, the opposite surfaces of the trays are engaged, as shown in FIG. 34, by jets of cleansing fluids of required types discharged from spray heads 516 which are supplied by conduits 518 with such fluid, under pressure. The spray heads 516 preferably are directed downwardly and a series of the same respectively are discharged onto said opposite surfaces of the trays 10. While being conveyed by conveyor 78 through the washing compartment 66, the trays are supported substantially in vertical position by a pair of elongated guide rolls 520 disposed adjacent the upper edges of the trays as they travel along the path therefor, as shown in FIG. 34. After the trays have been completely sanitized, including passage through the drying compartment 70, they are discharged onto the tray-receiving means 80 shown in FIG. 1A and stacked thereon.

SILVERWARE CLASSIFICATION

Figure 14:
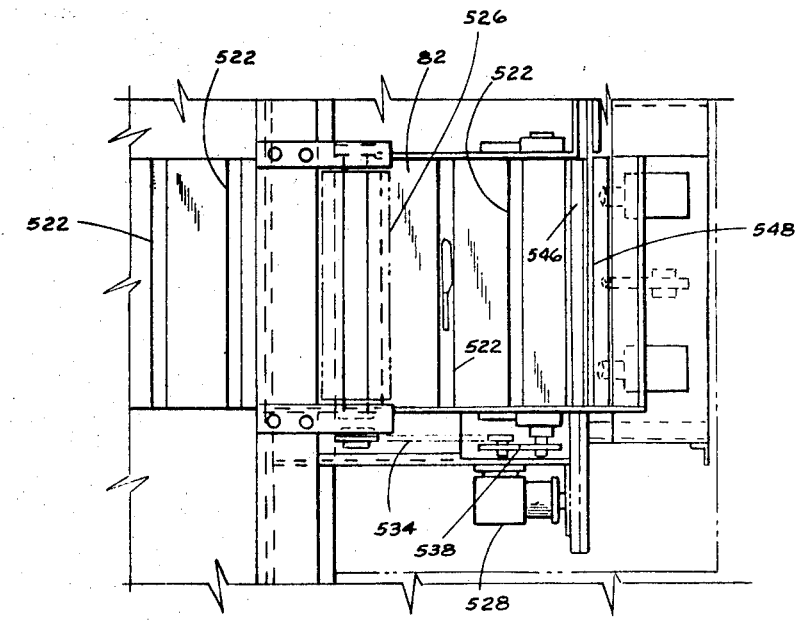
FIG. 14 is a fragmentary plan view of a lateral conveyor which receives and transfers silverware for delivery to the washing unit for the same.
Figure 15:
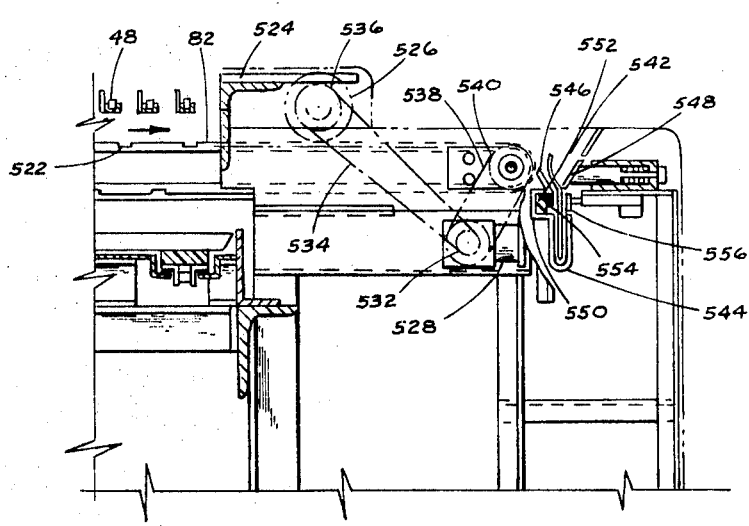
FIG. 15 is a rear vertical elevation of the mechanism shown in FIG. 14, as seen on the line 15—15 of FIG. 12.

The dishwashing system comprising the present invention also includes means for automatically sorting and segregating the various silverware items, such as knives, forks and spoons, into their respective categories. The mechanism to achieve this and the details thereof are shown to best advantage in FIGS. 14, 15, 17 and 18, as well as generally being shown somewhat diagrammatically in FIG. 1B. Referring especially to FIG. 1B, it will be seen that the silverware items fall through the spaces between the narrow conveyor belts 48 onto the silverware conveyor belt 82. Referring to FIGS. 14 and 15, it will be seen that the silverware conveyor belt 82 is provided with a series of parallel, shallow, relatively flat grooves 522 which extend between the opposite side edges of belt 82.

To insure that the various silverware items will be disposed, singly, in each of the grooves 522 and in parallel relationship thereto, a frame 524 is mounted above the upper course of the belt 82 and contains a rotatable windlass 526 having flexible fingers thereon which wipe over the upper surface of belt 522 and the silverware items deposited thereon and thereby insure that only a single silverware item will be disposed in each of the grooves 522. The windlass 526 is driven by a right-angle gear box 528 which is actuated by a shaft by conveyor belt 552.

The gear box 528 drives a pulley 532 which actuates drive belt 534 which extends around a driven pulley 536 connected to the rotatable windlass 526. The pulley 532 also is of a compound nature and has another driven belt 538 extending therearound of a larger diameter than that which drives belt 534 for purposes of driving the drum 540 around which the belt 532 extends at one end of the courses thereof.

As the belt moves in the direction of the arrow shown in FIG. 15, the silverware items which are disposed single fashion in each of the grooves 522 successively are discharged into the V-shaped channel 542. It has been found by experiment that when this occurs, the handle ends of all normal types of commercial silverware, such as employed in restaurants, hotels, and the like, will fall with the handle extending downwardly and thereby dispose the silverware items vertically with the handles disposed within guide channel 544. The V-shaped channel 542, incidentally, is defined at one side by a fixed guide plate 546, and at the opposite side by a spring-loaded guide plate 548.

Adjacent one side of the upper portion of guide channel 544 is a horizontal channel 550 having one side face open which is adjacent the guide channel 544 for purposes of receiving a flexible feed belt 552 preferably having a soft, yieldable and frictional face strip 554 which frictionally engages the silverware intermediately of the ends thereof and moves the same along the guide channel 544, slidably with respect to the relatively stationary guide bar 556 which also preferably is spring-loaded. The surface of the guide bar 556 which is slidably engaged by the silverware item is of a highly polished nature so as to afford minimum friction.

Figure 17:
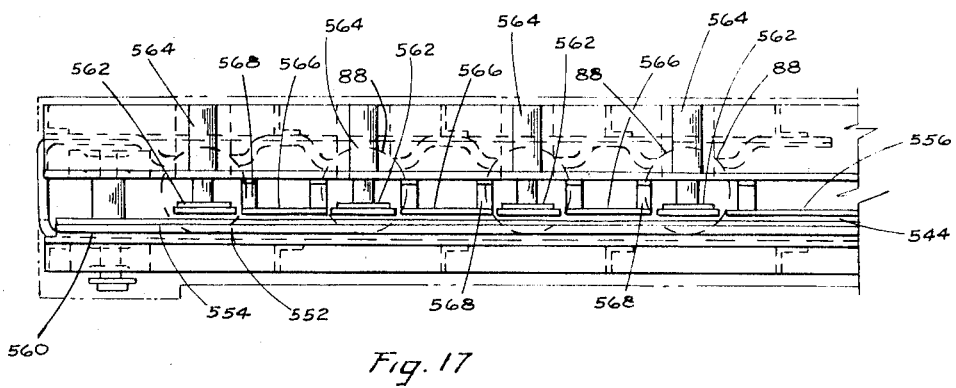
FIG. 17 is a fragmentary plan view of silverware conveying and unloading mechanism, as seen on line 17—17 of FIG. 18.

Referring particularly to FIG. 1A, the feed belt 552 and stationary guide bar 556 which defines a slot within which the vertically disposed silverware items move between the positioning means shown in FIGS. 14 and 15 and the classifying and receiving means 558 shown diagrammatically in FIG. 1A and in detail in FIG. 17, it will be seen from FIG. 1A in particular that the feed belt 552 and continuous guide bar 556 conduct the silverware items through the washing, sterilizing and drying compartments 66, 68 and 70 therefor, prior to reaching the classifying and receiving means 558 for the silverware.

Details of the silverware classifying and receiving means; 558 are best illustrated in FIG. 17 which is a top plan view thereof. The entrance end thereof is shown in the right of FIG. 17 as viewed on said sheet. In said figure, it will be seen that the longitudinally movable, flexible feed belt 552, which is provided with a soft, yieldable face strip 554, is movable toward the left as viewed in FIG. 17. Such composite flexible feed belt extends around a suitable pulley 560. The substantially continuous stationary guide bar 556, however, terminates adjacent the right-hand end of FIG. 17 which is immediately adjacent the spaced series of operative guide bars 562 and a first photocell 564 provided with a silhouette mask.

Successive photocells 562 correspondingly have silhouette-type masks. It will be understood that all of the silhouette mask outlines of the successive photocells 564 are shaped to correspond respectively to different types of silverware such as, for example, dinner forks, salad forks, teaspoons, and knives. Additional photocells and operative silhouette masks therefor may be provided which have other silhouette outlines such as soup spoons, ice tea spoons, etc., if desired.

Intermediately of the short operative spaced guide bars 562 are a series of short guide bar sections 566 respectively longitudinally aligned with each other and the terminal end of the fixed guide plate 556. The opposite ends of the sections 566 may be supported in any suitable manner such as pairs of transverse bracket arms 568. As the various silhouette items move sequentially along the guide channel 544 in slidable engagement with the stationary guide bar 556, the operative guide bar sections 562, and the additional guide bar sections 566, and as the various types or forms of silverware respectively pass the silhouette corresponding to the particular shape thereof, the photocell 564 of that particular mask energizes solenoid 565 associated therewith to retract the short guide bar sections 562 connected to the plunger of said solenoid. Such movement releases the silverware items for movement by gravity down the drop chute 570 shown in FIG. 18, so as to be received in the particular container 88 arranged beneath said guide chute 570 for that particular shape of silverware piece, such as a spoon, fork, knife, etc.

By the foregoing arrangement, it will be seen that the silverware items are all classified and when a particular container 88 is substantially filled, a signal light or otherwise, not shown, may be activated to call such, condition to the attention of the operator so as to replace the filled container with an empty one. Preferably, the containers are of such capacity as to hold a substantial number of an individual type of silverware items.

It also is to be understood that instead of storing the silverware items respectively in their individual containers 88, it is possible, by appropriate mechanism not illustrated but capable of being mounted in the illustrated silverware storage arranging unit 86, to package a selected arrangement of silverware items such as two spoons, a knife and a fork, in individual glassine or cellophane bags and dispose these in a suitable storage tray or receptacle until ready for use. By such an arrangement, it is seen that all of the silverware items may be either received in individual groups in appropriate containers, or individual packages of sets thereof, entirely without being contacted by human hands and completely by automatically operable equipment.

ALTERNATE DELIVERY EMBODIMENTS

The objectives and capabilities of the embodiment of the invention illustrated particularly in FIGS. 1A and 1B, including the various sanitizing, sorting, and stacking units thereof, may be associated with less automated introductory equipment than, for example, the particular holloware removal units 20–26 shown especially in FIG. 1A. Referring, for example, to the arrangement shown in FIG. 35, the same is especially adapted for use in restaurants and other food-serving institutions in which soiled holloware items, dish items, and silverware, are brought to the dishwashing facility in relatively large, heterogeneously arranged assortments thereof on, for example, a large serving tray 592. Trays of this type are commonly employed in large restaurants, hotel dining rooms, and the like.

Upon such a tray of soiled food-serving items being deposited upon an appropriate counter, table or the like, such as shown in FIG. 35, a single attendant can very quickly, somewhat with a motion resembling that of dealing cards, relieve the tray 592 of all of the soiled items thereon such as by positioning the dish items 302 upon the exemplary feed conveyor 74 which may be similar to the corresponding conveyor in the embodiment shown in FIGS. 1A and 1B. Such conveyor 74 in FIG. 35 also may travel at approximately the same rate of speed contemplated for that in FIGS. 1A and 1B.

It is only necessary for the individual operator to place the dish items 302 upon conveyor 74 in unstacked condition, i.e., one item high. Said conveyor then moves the dish items to a classifying and separating unit such as the unit 52 shown in FIG. 1B which, it will be understood, is adjacent the right-hand end of the portion of the delivery belts shown in FIG. 35, for example. Following means 72 and replacing the same with empty ones. tizing and stacking mechanism also of the type shown in the embodiment of FIGS. 1A and 1B may be employed, thereby tending to such operations in an automatic manner without the need for human operation or activity, except for the aforementioned removal of filled receiving means 72 and replacing the same with empty ones. The same attendant who attends to the loading of the feed conveyor 74 similarly can attend to such replacement.

In addition to placing the dish items 302 upon the feed conveyor 74, the same attendant will quickly place all of the holloware items, such as cups, tumblers, glasses, etc., in inverted conditions, upon an auxiliary feed conveyor 572, preferably substantially in a straight line, but, in the event the same are not exactly in a straight line, gradually inclined, elongated positioning cam 576 preferably is positioned adjacent the end of the auxiliary feed conveyor 574 where the holloware items are introduced in inverted manner.

A number of exemplary holloware items 130 are shown in FIG. 35 upon the feed conveyor 574 and it is to be understood that at least the upper surface of such conveyor is formed of such material as to offer substantially no frictional resistance, such material being of the same type as that either from which the conveyor 574 is formed or with which it is coated on its upper surface, as explained hereinabove. Such friction-free surface for the conveyor 574 is essential primarily in view of the classifying means for the holloware items 130 illustrated in FIG. 35. As in regard to the holloware classifying means of the embodiment shown in FIGS. 1A and 1B, the tallest holloware items are first engaged by an initial classifying cam rail which, for example, is fixed at an elevation parallel to the surface of conveyor 574 and supported by the appropriate bracket means which are shown in detail.

The classifying cam rail 578 will be adequate to gently move the tallest holloware items, such as ice tea glasses, diagonally while traveling upon a relatively wide feed conveyor 580 which preferably comprises an endless belt extending around a pair of appropriate supporting rollers, not shown in detail, but respectively arranged adjacent opposite ends of said conveyor. Said conveyor may be formed from the same material as feed conveyor 74 and auxiliary feed conveyor 574, perferably having a relatively friction-free outer surface to facilitate the caming of the inverted holloware items across the surface of the conveyor 580.

It also will be understood that the auxiliary conveyor 574 discharges at its delivery end 582 onto the receiving end of the wide feed conveyor 580. At the delivery end 584 of the wide feed conveyor 580, the various classified holloware items respectively are delivered to the entrance ends of the belt-type conveyors 28, 30, 32 and 34 respectively provided for the various classified types and sizes of holloware items as in regard to the embodiment of the invention shown in FIGS. 1A and 1B which serve to convey the holloware items through the various sanitizing compartments 36, 38 and 40, for example, as shown in FIG. 1B. At the completion of passage through these sanitizing compartments, the holloware items then are introduced to the receiving compartment such as the type thereof shown in FIG. 1B and details of which are illustrated in succeeding figures for purposes of placing the various sizes of holloware items respectively on storage trays in the manner described herein above with respect to the embodiment of FIGS. 1A and 1B.

Additional positioning cams 586, 588 and 590 respectively are disposed successively at lower levels and substantially parallel to the first-mentioned positioning cam 578, as well as being parallel to each other and respectively devised to classify and separate other heights of holloware items such as water tumblers, cups and footed sherberts respectively into rows thereof for introduction onto the belt-type conveyors 28–34 illustrated fragmentarily in FIG. 35 for passage to the various sanitizing compartments as explained above with respect to the holloware items classified by positioning cam 578.

From the foregoing description with respect to the apparatus of the embodiment shown in FIG. 35, it will be seen that a minimum amount of manual labor and effort is required to effect a second type of automatic classification of both dish items and holloware items from that shown in the embodiment illustrated in FIGS. 1A and 1B. It also will be understood in regard to the embodiment of FIG. 35 that the silverware may be deposited upon the feed conveyor 74 for ultimate separation therefrom when the silverware reaches the narrow conveyor belts 48, such as shown in FIG. 1B, from which they are transferred to the silverware conveyor belt 82 and from there the same are sanitized and classified by the mechanism described above with respect to the apparatus shown in detail, for example, in FIGS. 15, 17 and 18.

Figure 36:
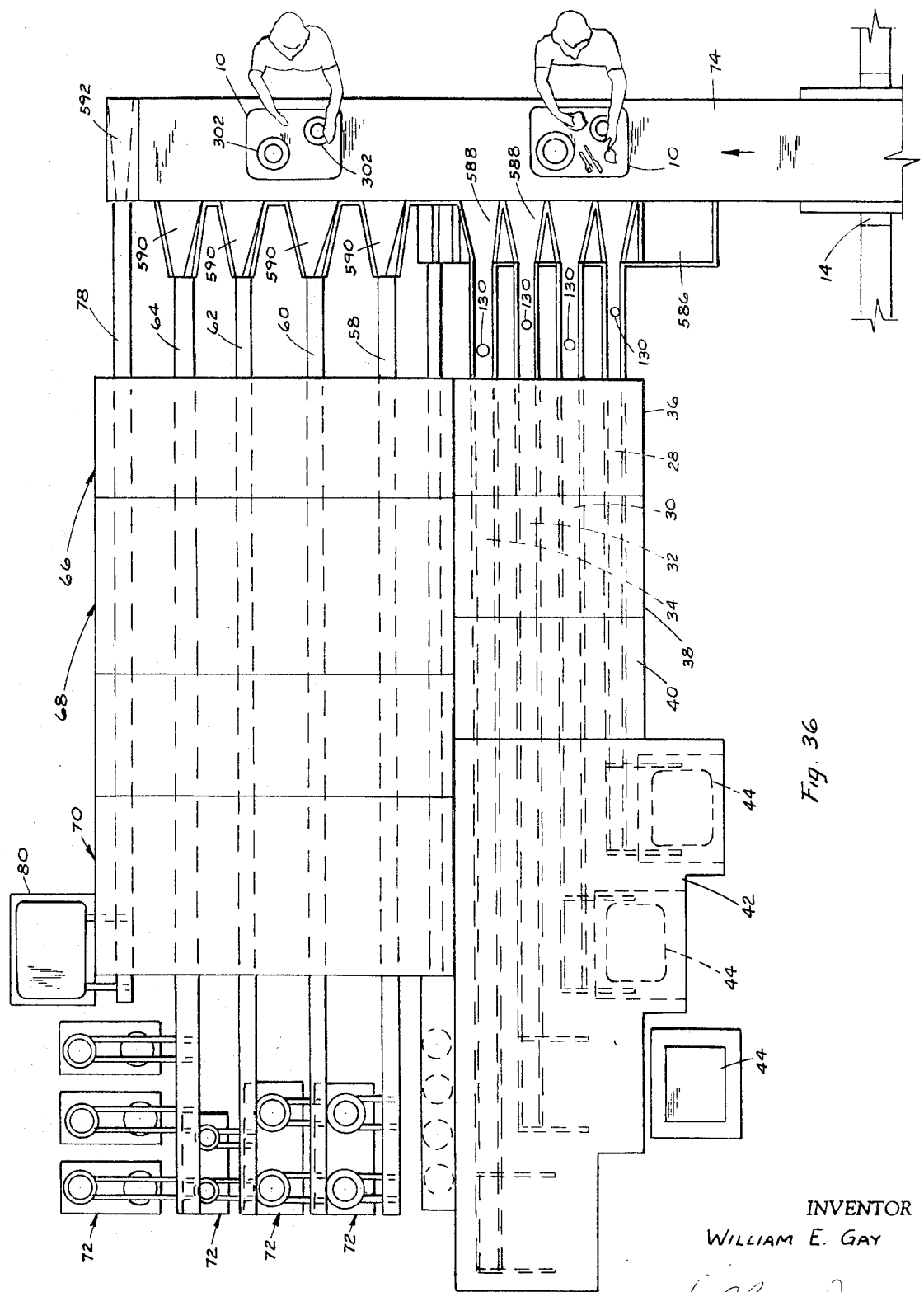
FIG. 36 is a plan view of a still further embodiment of cleansing and sanitizing system from those shown in FIGS. 1A, 1B and 35 arranged to have dishes, glassware and silverware distributed to the various cleansing and sterilizing units by different manual means from that used in the embodiment of FIG. 35.

The present invention contemplates a still further introductory system by which the soiled dish items, silverware and holloware items are arranged for delivery to the various sanitizing compartments and the automatic storage arrangement thereof, details of which are shown particularly in the embodiments shown primarily in FIGS. 1A and 1B and details of which are shown in succeeding figures. Referring to FIG. 36, it will be seen that the introductory feed conveyor 74 is arranged to transfer trays 10, for example, such as are used in cafeterias and the like, through the opening 14 in the wall separating the dishwashing room from the dining area, for example.

In this further embodiment, it is contemplated that either one or two human operators are positioned along one side of the feed conveyor 74, opposite the side from which the various belt-type conveyors 28, 30, 32 and 34 respectively for different sizes and types of holloware are provided to convey the same through the sanitizing compartments 36, 38 and 40 which preferably are of the type illustrated in the embodiment shown in FIGS. 1A and 1B, these being for the same purposes described hereinabove with respect to FIGS. 1A and 1B. Further, the conveyors 28–36 move the sanitized holloware to the receiving compartment 42 and transfer the same to the storage trays 44 by the mechanism illustrated and described hereinabove with respect to the embodiments of FIGS. 1A and 1B.

In regard to the embodiment of FIG. 36, the first operator may be stationed to additionally engage the trays 10 which contain the soiled food-serving items to remove the holloware items therefrom, respectively disposing the different heights and types thereof onto a relatively wide auxiliary feed conveyor 586 which extends across the receiving ends of all of the belt-type conveyors 28, 30, 32 and 34. Flared entrance guide means 588 facilitate the introduction of the manually classified holloware items into rows upon the auxiliary feed conveyor 586 for delivery thereof to the entrance ends of said belt-type conveyors 28–34.

The trays which have thus been relieved of the holloware items then move to the second operator shown in FIG. 36 relative to the direction of travel of the feed conveyor 74 for purposes of the dish items 302 to be manually removed and classified appropriately into the flared entrance guide means 590 which, if desired, may comprise either the entrance to the dish item sanitizing conveyor means 58, 60, 62 and 64, whereby the operator inserts the dish items into the entrance guide means 590 in vertical condition so as to be received between the vertically spaced guide and conveying means of the sanitizing conveyor means 58–64 of the type illustrated and described hereinabove with respect to the embodiments shown in FIGS. 1A and 1B, or, if desired, the entrance guide means 590 respectively may be provided with position-changing mechanism to shift the dish items from horizontal to vertical position such as of the type of mechanism shown in FIG. 20, for example, with respect to the embodiment of FIGS. 1A and 1B.

After the dish items have been classified and transferred to the various conveyors 58–64 which respectively carry the same through the various sanitizing compartments 66, 68 and 70, the sanitized dish items then are conducted to the various receiving means 72, details of which preferably are the same as those described above with respect to the embodiment shown in FIGS. 1A and 1B.

Further as in regard to the embodiment shown in FIGS. 1A and 1B, the embodiment illustrated in FIG. 36 likewise provides an entrance means 592 into which the emptied trays 10 may be inserted in vertical arrangement for transfer by conveyor 78 through the various sanitizing compartments and ultimately said sanitized trays are stacked on the tray-receiving means 80, whereby the embodiment of FIG. 36 still further simplifies the introductory aspects particularly and certain of the classifying aspects of the preceding embodiments by utilizing one additional human operator from the single operator which is preferred for operating the embodiments shown respectively in FIGS. 1A, 1B and FIG. 35.

While many of the control and actuating mechanisms described hereinabove and illustrated on the drawings with respect to the various embodiments are indicated as being of an electrical nature, it is understood that in order to utilize electrically operated devices in many of the locations in the various embodiments, they will have to be of a highly moisture and waterproof nature. To obviate the expense of electrical equipment of this type, it is to be understood that other forms of controls and/or prime power sources other than electricity might be used, including, in particular, pneumatic and hydraulic prime power means and mechanisms such as appropriate conduits and pneumatic logic controls of which various commercial types are available. Such additional types of operating means utilizing other than electrical prime power are highly suited for use in dishwashing equipment of the type shown in the various embodiments illustrated and described herein, particularly since the movement of most of the conveyors and other means for handling the dish, holloware and silverware items is at a relatively slow speed.

It also is recognized in regard to the overall system, mechanisms and various units and the like, of the different embodiments described above and illustrated in the drawings hereof, especially to minimize the complexity of the equipment as much as possible, such embodiments have contemplated the handling of at least the most commonly employed types and sizes of dish, silverware and holloware items. However, it is recognized that other types of food and beverage-serving items are not infrequently used in food and beverage-serving establishments.

Among these other items are carafes or teapots, coffeepots and the like, as well as conventional metal dish covers which are utilized not only for purposes of maintaining food in warm condition when served upon a plate, but also to enable the stacking upon each other of a number of plates upon which food servings have been arranged prior to distribution to patrons in a restaurant, patients in a hospital or otherwise. To obviate the need for further contemplating the dishwashing equipment envisioned by the various embodiments described and illustrated herein, it is contemplated that deviations from conventional designs of these other types of food and beverage-serving items readily may be made in order to either provide items of disposable nature or items which more readily can be handled by the equipment described and illustrated herein.

By way of illustration in exemplary manner of the substitution of disposable specialized items of the type referred to immediately above, attention is directed to FIG. 37, for example, wherein an appropriate design of beverage container 594 is illustrated. Such container may be made from cellular synthetic resin material, one brand of which is available under the trade name "Styrofoam." The side wall of the container 594 may be provided with a plurality of finger-receiving indentations 596 in order that the same might be securely grasped by the person pouring the beverage, as well as in handling the same while it is being filled. Similarly, an appropriate and readily removable heat-retaining top 598 may be provided, the same being formed from material similar to that from which the container 594 is formed. Various sizes of such containers and corresponding tops may be provided, depending upon the type of beverage to be contained therein as well as the number of persons to be served thereby. When formed of the material suggested above, rather than cleanse such container, it readily may be expended after each use since the cost of such individual containers is infinitesimal.

Similarly, in FIG. 38, a dish cover 600 is illustrated of suitable design which readily may be stacked, the same being formed either from relatively thin, foam-type and rigid synthetic resin, similar to the material from which it is suggested that the beverage container 594 be formed. Such dish cover 600 readily is suited to retain heat in the food servings upon the dish covered thereby, yet the cost of the same is so negligible that it readily may be disposed after each use.

When the trays filled with soiled food and beverage-serving items are received upon the feed conveyor 74 of the various embodiments, for example, illustrated and described herein, the operator or attendant can be provided with a readily positioned waste can or suction-removal device into which the expendable items are quickly tossed preferably prior to the nonexpendable items being removed from the trays.

While the invention has been illustrated and described in its several preferred embodiments, it is to be understood that the same is not to be limited to the precise details herein illustrated and described since the same may be carried out in other ways falling within the scope of the invention.

What is claimed is:

1. A dish cleansing and sanitizing system comprising in combination, means to receive a mixture of soiled dish and holloware items in heterogeneous condition for classification, sanitizing conveyor means to receive dish and holloware items after classification and separation into categories of similar items, cleansing and sterilizing means, drying means, means to support and move said sanitizing conveyor means to feed classified and separated dish and holloware items successively through said cleansing and sterilizing means and also through said drying means, means to assemble said classified dish and holloware items after being dried by said drying means, and means to arrange said sanitized classified dish and holloware items in closely assembled relationship.

2. The dish cleansing and sanitizing system according to claim 1 in which said sanitizing conveyor means comprises flexible elongated means mounted for movement to engage and support dish and holloware items in predetermined positions through said cleansing and sterilizing and drying means.

3. The dish cleansing and sanitizing system according to claim 2 in which said sanitizing conveyor means is arranged to engage the items supported thereby progressively at different contact points and areas to insure washing all portions of the surfaces thereof.

4. The dish cleansing and sanitizing system according to claim 3 in which said sanitizing conveyor means is arranged to hold dish items substantially vertically at least while passing through said cleansing and sterilizing means, and said system further including spray heads supported and operable to discharge spray jets of cleansing fluid against the opposite surfaces of said dish items and directed thereagainst substantially perpendicularly to said surfaces.

5. The dish cleansing and sanitizing system according to claim 2 further including means to change the position of dish items passing through said system from an initial substantially horizontal position to a substantially vertical position for passage through said cleansing and sterilizing means.

6. The dish cleansing and sanitizing system according to claim 5 further including means to restore said dish items to substantially horizontal position at the completion of the drying thereof and also including means to stack said dish items upon each other when restored to such substantially horizontal position.

7. The dish cleansing and sanitizing system according to claim 6 in which said means to receive said dish items in stacked condition upon each other comprise supporting means arranged to be lowered progressively as said dish items are successively added to the top of said stacks, whereby the uppermost dish item in each stack is substantially even with the level at which said dish items are delivered to the top of said stacks.

8. The dish cleansing and sanitizing system according to claim 7 in which said receiving means for said dish items comprise at least a pair of said lowering means, whereby multiple stacks may be formed successively, and said system further including means to direct dish items as delivered to said dish-receiving means successively to said second stack after an initial stack of a predetermined number of dish items has been formed.

9. The dish cleansing and sanitizing system according to claim 8 in which said dish-receiving means are portable and arranged to move substantially horizontally over a supporting surface, and said system further including means to position said portable dish-receiving means operatively relative to said sanitizing conveyor means to receive said cleansed and sterilized items from said conveyor means after being dried.

10. A dish cleansing and sanitizing system according to claim 2 in which said sanitizing conveyor means included in the system to receive holloware is arranged to support the same in inverted position and said cleansing and sterilizing means comprising spray nozzles positioned adjacent the sides and bottom of said sanitizing conveyor means.

11. The dish cleansing and sanitizing system according to claim 10 further including guide rails positioned substantially parallel to each other and to said sanitizing conveyor means for said holloware.

12. The dish cleansing and sanitizing system according to claim 10 in which said means to arrange said holloware in closely assembled relationship comprise means to position said holloware in inverted position in rows upon trays.

13. The dish cleansing and sanitizing system according to claim 12 further including indexing means operable to place successive rows of inverted holloware upon said trays for support by the rims of said holloware.

14. The dish cleansing and sanitizing system according to claim 12 further including means to support a substantially vertical stack of trays, and means operable to release the lowermost tray from said stack sequentially and position the same to receive said rows of holloware thereon.

15. The dish cleansing and sanitizing system according to claim 12 further including means operable to receive trays loaded with inverted sanitized holloware and stack said loaded trays upon each other.

16. The dish cleansing and sanitizing system according to claim 1 further including initial feed conveyor means arranged and supported respectively to receive a single layer of miscellaneous dish items and at least one row of inverted holloware, means positioned relative to said initial feed conveyor means to receive said miscellaneous dish items and being operable to classify and separate the same into similar size and shape categories, transfer means operable to transfer said classified and separated dishes to said sanitizing conveyor means, said sanitizing conveyor means comprising separate conveyor means for each different principal type of dish items being sanitized, and said system also including means operable adjacent said initial feed conveyor means for said inverted holloware to separate the same into different rows of holloware according to the size thereof and each row comprising holloware of similar size.

17. The dish cleansing and sanitizing system according to claim 16 in which said transfer means from said dish-classifying means is operable to invert said dish items from an initial substantially horizontal position to a substantially vertical position for reception by said sanitizing conveyor means to move said dish items through said cleansing and sterilizing means of said system while supported substantially vertically.

18. The dish cleansing and sanitizing system according to claim 16 further including rail-type guides adjacent said initial feed conveyor means for said inverted holloware, said feed conveyor means comprising separating means to classify each principal size of holloware according to height and said rail-type guides being positioned relative to said conveyor means for holloware respectively according to the height of the holloware to be conveyed thereby and engageable with the uppermost surfaces of said holloware while the same is being moved by said feed conveyor through said cleansing and sterilizing means.

19. A dishwashing system comprising in combination, feed conveyor means arranged to receive trays containing dish and holloware items, means to remove said holloware items from said trays, means to remove said dish items from said trays, means to classify said dish items according to type, sanitizing conveyor means arranged respectively to receive said holloware items and classified dish items and support the same for washing while moving along predetermined paths, washing and sterilizing means arranged to receive said holloware and dish items while supported by said sanitizing conveyor means for movement through said washing and sterilizing means, drying means arranged to receive said items after being washed and sterilized, and supporting means arranged to receive said dried items in closely assembled relationship.

20. The dish cleansing and sanitizing system according to claim 19 in which said means to remove said holloware items from said trays includes means to classify said holloware items into rows according to the height thereof, each row containing holloware items substantially of the same height.

21. The dish cleansing and sanitizing system according to claim 20 in which said means to remove holloware items from said trays comprises a plurality of removal units respectively arranged to engage holloware of different heights and each unit engaging holloware items only of a specific height to which that unit has been adapted.

22. The dish cleansing and sanitizing system according to claim 21 in which said holloware removal units include mechanism arranged to engage the rims of holloware items and being movable vertically to elevate the holloware items thus engaged thereby to remove the same from said trays while being moved on said feed conveyor.

23. The dish cleansing and sanitizing system according to claim 19 in which said removal units also contain mechanism operable to invert said holloware items and convey the same in said inverted positions from said removal units.

24. The dish cleansing and sanitizing system according to claim 23 further including means operable and positioned to receive inverted holloware items from said removal means and transfer the same to said sanitizing conveyor means for movement thereby to said washing and sterilizing means.

25. The dish cleansing and sanitizing system according to claim 23 further including mechanism in said holloware removal means operable to remove debris from said holloware items prior to the same being moved to said washing and sterilizing means.

26. The dish cleansing and sanitizing system according to claim 19 in which said means to remove dish items from said trays comprise conveyor means having a portion supported for movement into each tray as moved along a predetermined path upon said receiving conveyor and operable to convey dish items out of said tray, said system also including means to classify and separate said dish items into similar categories according to type, and said dish removal conveyor means also being operable to transfer said dish items as removed from said trays to said classifying means.

27. The dish cleansing and sanitizing system according to claim 26 further including control means operable upon movement of a tray adjacent the dish removal conveyor means to depress the leading end portion of said dish removal conveyor means into said tray immediately after the leading end of said tray reaches said leading end of said dish removal conveyor means and said control means further being operable to maintain said leading end of said dish removal conveyor means closely adjacent the inner bottom surface of said trays as the same are moved by said receiving conveyor relative to said dish removal conveyor means to insure movement of dish items onto said removal conveyor means.

28. The dish cleansing and sanitizing system according to claim 26 in which said dish removal conveyor means comprises a support member having a feathered leading end and a series of parallel narrow endless belts mounted for movement around said feathered leading end of said conveyor support member, and said system further including means common to all of said narrow belts and operable to drive the same simultaneously unidirectionally.

29. The dish cleansing and sanitizing system according to claim 26 in which said dish removal conveyor means is supported and directed to elevate dish items received thereon to a higher level above said feed conveyor and said feed conveyor being arranged to support said trays after being emptied of dish and holloware items, said system further including washing means for said trays and said feed conveyor being arranged to deliver said empty trays to said washing means after being emptied of items previously thereon.

30. The dish cleansing and sanitizing system according to claim 26 in which said dish removal conveyor means also removes silverware from said trays, and said system further including cleansing means for silverware and means operable to separate and classify said silverware into similar categories and also including conveyor means operable to carry said silverware through said cleansing means therefor.

31. The dish cleansing and sanitizing system according to claim 30 in which said silverware conveyor means is slotted and arranged to support the same substantially vertically while being moved through said cleansing bath therefor.

32. The dish cleansing and sanitizing system according to claim 31 in which said system further includes means to support silverware storage receptacles respectively in position to receive cleansed and classified silverware from said silverware conveyor means.

33. The dish cleansing and sanitizing system according to claim 19 in which said means to classify items comprises a classifying conveyor arranged to receive dish items as removed from said trays and also including classifying cam means positioned adjacent said classifying conveyor and including multiple cam surfaces operable to engage rims of said dish items and push the same laterally past one edge of said classifying conveyor at predetermined longitudinally arranged locations relative to said multiple cam surfaces according to the diameters of said dish items.

34. The dish cleansing and sanitizing system according to claim 33 in which said sanitizing conveyor means comprises a plurality of substantially parallel and spaced sanitizing conveyor members, the entrance ends of the spaces between sand sanitizing conveyor members being substantially opposite the location on said classifying conveyor where said dish items are pushed therefrom, thereby to receive dishes from said classifying conveyor.

35. The dish cleansing and sanitizing system according to claim 33 further including transfer means extending laterally from said classifying conveyor and operable to transfer dish items as removed from said classifying conveyor to said sanitizing conveyor means.

36. The dish cleansing and sanitizing system according to claim 35 in which said transfer means are arranged and operable to tilt dishes from a substantially horizontal to a substantially vertical position for engagement by said sanitizing conveyor means when in said substantially vertical positions.

37. The dish cleansing and sanitizing system according to claim 36 in which said sanitizing conveyor members comprise vertically spaced courses respectively positioned to engage the opposite edges of dish items supported thereby, said vertically spaced courses engaging said dish items at spaced locations and of minimum contact areas.

38. The dish cleansing and sanitizing system according to claim 37 in which one course of said sanitizing conveyor means is stationary and the other is movable longitudinally to cause dish items supported by said courses to rotate about the axes of said dish items and thereby continually change the points of engagement of said courses with the rims of such dish items.

39. The dish cleansing and sanitizing system according to claim 38 in which said stationary course includes yieldable contact means engageable with the rims of dish items and operable to accommodate limited variations in the diameters of the dish items received between said courses.

40. The dish cleansing and sanitizing system according to claim 38 in which said movable course of said sanitizing conveyor means includes dish item engaging means spaced from each other thereon and respectively engageable with such dish item at a plurality of spaced locations on the periphery thereof and disposed opposite to said stationary course of said sanitizing conveyor means to insure positive feed of said dish items with respect to said stationary course.

41. The dish cleansing and sanitizing system according to claim 40 in which said plurality of engaging means on said movable course of said sanitizing conveyor means comprise rotatable rollers supported pivotally by said movable course of said conveyor means.

42. The dish cleansing and sanitizing system according to claim 38 in which said stationary course of said sanitizing conveyor means is grooved to receive therein a rim portion of each dish item moved by said sanitizing conveyor means.

43. The dish cleansing and sanitizing system according to claim 19 further including means to remove waste debris from soiled dish items prior to the same being classified according to size.

44. The dish cleansing and sanitizing system according to claim 43 in which said means to remove debris from dish items is positioned above said dish removal conveyor means.

45. The dish cleansing and sanitizing system according to claim 19 in which said sanitizing conveyor means is arranged to support dish items in substantially vertical position for movement through said washing and sterilizing means and said drying means of said system, and said system further including means to restore said dish items to a horizontal position following the drying thereof, and means positioned and operable to stack said dish items in separate vertical stacks of substantially uniform height.

46. The dish cleansing and sanitizing system according to claim 45 in which said means to restore said dish items to horizontal position comprises means to release the lower edges of said dish items from said sanitizing conveyor means and including a curved surface upon which the lower edges of said dish items slide by gravity and terminate at the conclusion of such sliding movement in substantially horizontal position.

47. The dish cleansing and sanitizing system according to claim 46 in which said curved surface terminates adjacent said vertically movable supporting means to receive said dish items successively in vertically stacked arrangement upon each other and operable to maintain the upper level of said stacks substantially even with said transfer means to receive successive dish items therefrom and arrange the same upon the top of said stack.

48. The dish cleansing and sanitizing system according to claim 47 in which said means to receive and support stacked dish items from said transfer conveyors comprise a plurality of said supporting means for each size of dish item and further including directing means operable between said transfer conveyors and said supporting means to direct successive dish items initially to one of said supporting means until a stack of desired size has been received thereby and said directing means then being operable to shift the delivery of dish items to the other supporting means for the formation of a second stack of dish items thereupon.

49. The dish cleansing and sanitizing system according to claim 1 in which said sanitizing conveyor means comprising a plurality of conveyors positioned substantially parrallel to each other and in relatively close transversely spaced arrangement, the entrance ends of said santizing conveyors being positioned substantially along a line transverse to the paths of movement of said conveyors, and said system including an initial feed conveyor operable to receive and move soiled dish and holloware items along a predetermined path extending transversely past the entrance ends of said sanitizing conveyors, whereby at least one operator may conveniently and manually quickly classify said soiled items taken from said initial feed conveyor by positioning the dish items selectively upon the sanitizing conveyor arranged to receive selected sizes and shapes of dish items and also position holloware items in inverted condition upon the sanitizing conveyors provided for individual sizes and shapes of holloware items, whereby the soiled dish and holloware items may be quickly moved from said initial feed conveyor to the cleansing and sterilizing as well as the drying means of said system.

50. The dish cleansing and sanitizing system according the claim 49 in which flared entrance guide means respectively are provided adjacent the entrance ends of said sanitizing conveyors and are operable to accurately position the soiled items upon said sanitizing conveyors.

51. The dish cleansing and sanitizing system according to claim 49 in which said means to assemble and classify said dish and holloware items are positioned at the ends of said sanitizing conveyors opposite the delivery ends thereof, whereby said sanitizing conveyors are disposed compactly in side-by-side relationship within parallel and substantially straight vertical planes extending between spaced positions along said initial feed conveyor and said means to assemble and classify said dish and holloware items.

References Cited

UNITED STATES PATENTS

| | | | |
|---|---|---|---|
| 904,010 | 11/1908 | Parry. | |
| 1,354,049 | 9/1920 | Linton | 134—68 |
| 1,392,781 | 10/1921 | Marsh et al. | 134—63 |
| 2,750,611 | 6/1956 | Chatel | 134—115 XR |
| 3,232,425 | 2/1966 | LeVan Hansen et al. | 134—63 XR |
| 3,247,858 | 4/1966 | Kraeft | 134—63 XR |
| 3,389,711 | 6/1968 | Slayton | 134—63 |

ROBERT L. BLEUTGE, Primary Examiner

U.S. Cl. X.R.

134—115